United States Patent [19]
Rigoutsos

[11] Patent Number: 5,802,525
[45] Date of Patent: Sep. 1, 1998

[54] TWO-DIMENSIONAL AFFINE-INVARIANT HASHING DEFINED OVER ANY TWO-DIMENSIONAL CONVEX DOMAIN AND PRODUCING UNIFORMLY-DISTRIBUTED HASH KEYS

[75] Inventor: Isidore Rigoutsos, Long Island City, N.Y.

[73] Assignee: International Business Machines Corporation, Armonk, N.Y.

[21] Appl. No.: 787,658

[22] Filed: Jan. 21, 1997

Related U.S. Application Data

[60] Provisional application No. 60/031,613 Nov. 26, 1996.

[51] Int. Cl.⁶ .................................................. G06F 17/30
[52] U.S. Cl. ........................ 707/103; 707/530; 345/423; 345/424
[58] Field of Search ................ 707/1, 5, 10, 100–104, 707/200–206, 530; 345/423, 424, 427

[56] References Cited

U.S. PATENT DOCUMENTS

| | | | |
|---|---|---|---|
| 5,133,052 | 7/1992 | Bier et al. | 707/530 |
| 5,706,416 | 1/1998 | Mann et al. | 345/427 |

OTHER PUBLICATIONS

Ambartzumian, R.V., Factorization Calculus and Geometric Probability. Cambridge University Press, 1990, pp. 82–99.

Califano A. et al., "FLASH: A Fast Look–Up Algorithm for String Homology" Computational Approaches Biological Systems. To Appear Feb. 1995.

Califano A. et al., "Multidimensional Indexing for Recognizing Visual Shapes" IEEE Trans. on Pattern Analysis & Machine Intel., 16:4, pp. 373–392, 1994.

Faloutsos C. et al., "Beyond Uniformity & Independence: Analysis of R–trees Using the . . . " Proceed. 1994 ACM PODS Conference on Principles of Database Systems, Minneapolis, MN, 1994.

Faloutsos, C., "Gray Codes for Partial Match and Range Queries" IEEE Transactions on Software Engineering, 14:10, 1987.

Flynn, P. et al., "3D Object Recognition Using Invariant Feature Indexing of Interpret . . . " Computer Vision, Graphics, & Image Processing: Image Understanding, 55:2, pp. 119–129, 1992.

Fisanick, W. et al., "Similarity Searching on CAS Registry Substances 1:Global . . . " Journal of Chemical Information & Computer Sciences, vol. 32, No. 6, pp. 664–674, 1992.

(List continued on next page.)

*Primary Examiner*—Thomas G. Black
*Assistant Examiner*—Ruay Lian Ho
*Attorney, Agent, or Firm*—Louis J. Percello

[57] ABSTRACT

A uniform distribution of affine invariants is produced for a plurality of one or more two-dimensional objects. Each of the two-dimensional objects is defined by a set of object points selected from an object feature domain. By selecting one or more five-point tuples of the object points, three of the object points divide the object feature domain into a region arrangement of seven regions while the fourth point of the four-point tuple lies in one of the seven regions and each of the four-point tuples further defines each of the seven regions as one of four non convex quadrilateral arrangements or one of three convex quadrilateral arrangements. A four-point tuple is said to belong to class I if the fourth point of the tuple resides in the I-th of the 7 regions defined by the first three points. A tagger identifies each of the four-point tuples as having one of the arrangements with one of the regions containing the fourth point of the four-point tuple. During a knowledge accumulation mode, and using either synthetically generated or real data, an equalizer accumulates knowledge about occupancy patterns incurred by four-point tuples belonging to each of the 7 classes and then derives the necessary remappings that will result in an expected uniform distribution over the range of invariants for all produced invariants.

22 Claims, 31 Drawing Sheets

OTHER PUBLICATIONS

Fisanick,W. et al., "Similarity Search On CAS Registry Substances 2:2D Structural Simil . . . " Journal of Chemical Information & Computer Sciences, vol. 34, No. 1, pp. 130–140, 1994.

Gavrila D. et al., "3D Object Recognition From 2D Images Using Geometric Hashing" Pattern Recognition Letters, 13:4, pp. 263–278, 1992.

Guenther O. et al., "Research Issues in Spatial Databases" ACM SIGMOD Record, 19:4, pp. 61–67, 1990.

Guttman A., "R–trees: A Dynamic Index Structure For Spatial Searching" Proceedings 1984 ACM SIGMOD Conference, pp. 47–57, 1984.

Haralick R., et al., "Optimal Affine–Invariant Matching: Performance Characterization" Proceedings SPIE Conference On Image Storage & Retrieval, San Jose, CA, Jan., 1992.

Haralick, R. et al., "Optimal Affine–Invariant Point Matching" Proc. 6th Israeli Conf. On Artificial Intell. & Computer Vision, Tel Aviv, Isreal Dec. 1989.

Jagadish, H.V. "Linear Clustering of Objects with Multiple Attributes" Proceedings 1990 ACM SIGMOD Conference on the Management of Data, Atlantic City, NJ 1990.

Knott, G., "Hashing Functions" The Computer Journal, 18:3, 1975.

Kroll B. et al., "Distributing A Search Structure Among A Growing Number of Processors" Proceedings 1994 ACM SIGMOD Conference The Management of Data, pp. 265–276, 1994.

Lamdan Y. et al., "Geometric Hashing: A General & Efficient Model–based Recognition Scheme" Proceedings Int'l Conference on Computer Vision, pp. 238–249, 1988.

Matsliach G. et al., "An Efficient Method For Distributing Search Structures" Proc. First Int'l Conference on Parallel & Distributed Information Systems, pp. 159–166, 1991.

Press, W. et al., "Numerical Recipes in C: The Art of Scientific Computing" Cambridge University Press 1988, pp. 680–689.

Rigoutsos I. et al., "Searching In Parallel For Similar Strings" IEEE Computational Science & Engineering, pp. 60–75, Summer, 1994.

Rigoutsos I. et al., "A Bayesian Approach to Model Matching with Geometric Hashing" Computer Vision & Image Understanding, 61:7, Jul., 1995.

Rigoutsos I. et al., "Several Results on Affine Invariant Geometric Hashing" Proceed. 8th Int'l Conf. on Computer Vision & Artificial Intel., Tel Aviv, Isreal Dec. 1991.

Rigoutsos, I., "Massively Parallel Bayesian Object Recognition" PhD Thesis, New York University, Aug., 1992, pp. v–xii, 71–159, & 184–198.

Rigoutsos, I. et al., "Flexible Substructure Matching & Novel Conformer Generation For . . . " Submitted for Publication to Journal of Computer–Aided Molecular Design, Jun., 1996.

Salzberg, B., "Practical Spatial Database Access Methods" IEEE Symposium on Applied Computing, pp. 82–90, 1991.

Satoh, T. et al., "An Index Structure for Parallel Database Processing" Proceedings 2nd IEEE Workshop on Research Issues On Data Engineering, pp. 224–225, 1992.

Solomon, H. Geometric Probability. Society for Industrial & Applied Mathematics Philadelphia, Pennsylvania, 1978.

Stein F. et al., "Efficient Two–dimensional Object Recognition" Proceed. Int'l Conference on Pattern Recognition, pp. 596–600, Atlantic City, NJ Jun., 1990.

Weinshall, D. et al. "3D Object Recognition By Indexing Structural Invariants From . . . " Proceed. Int'l Conference on Computer Vision, pp. 264–268, Berlin, Germany, May, 1993.

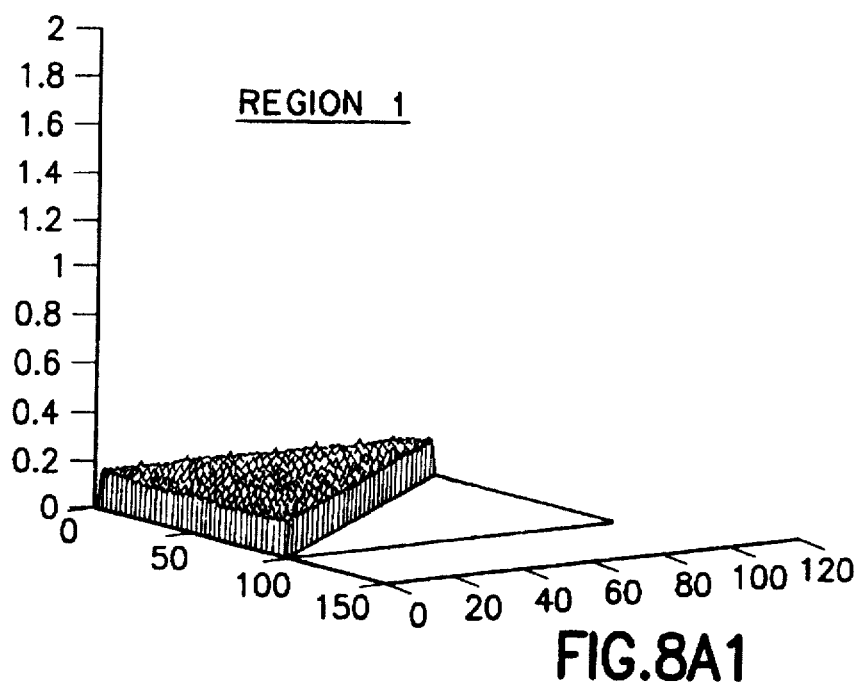
FIG.8A1
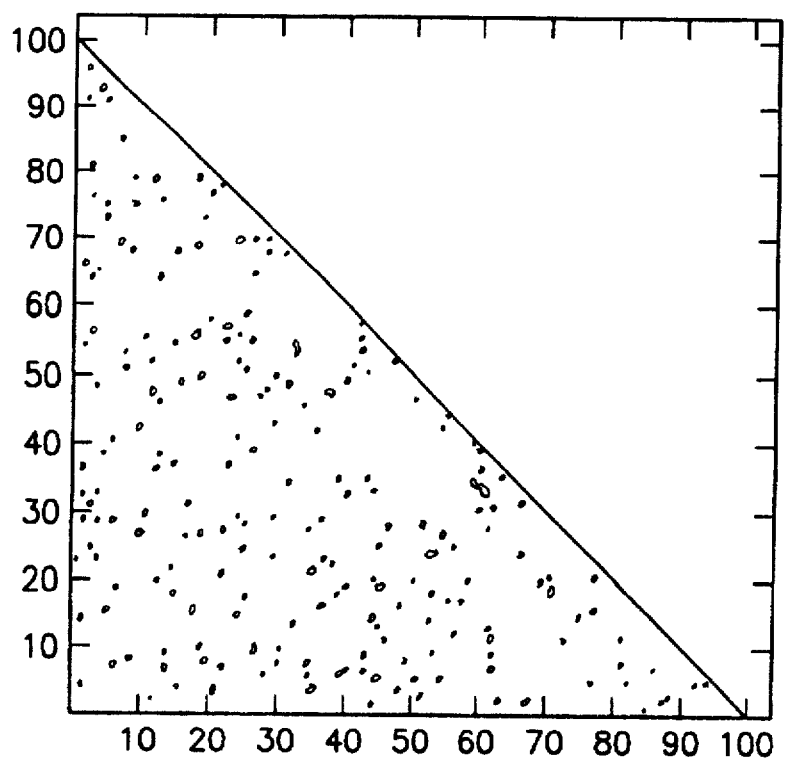
FIG.8B1

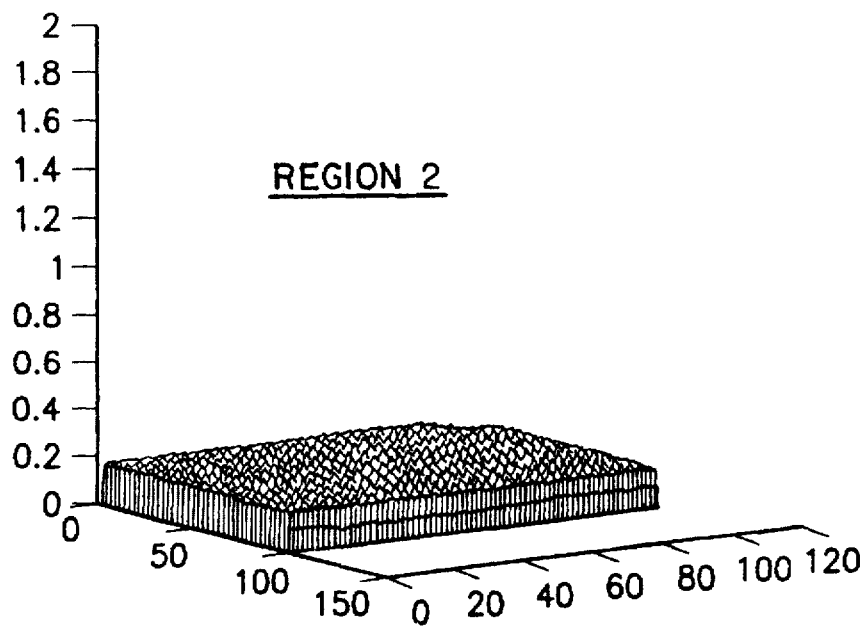
FIG.8A2
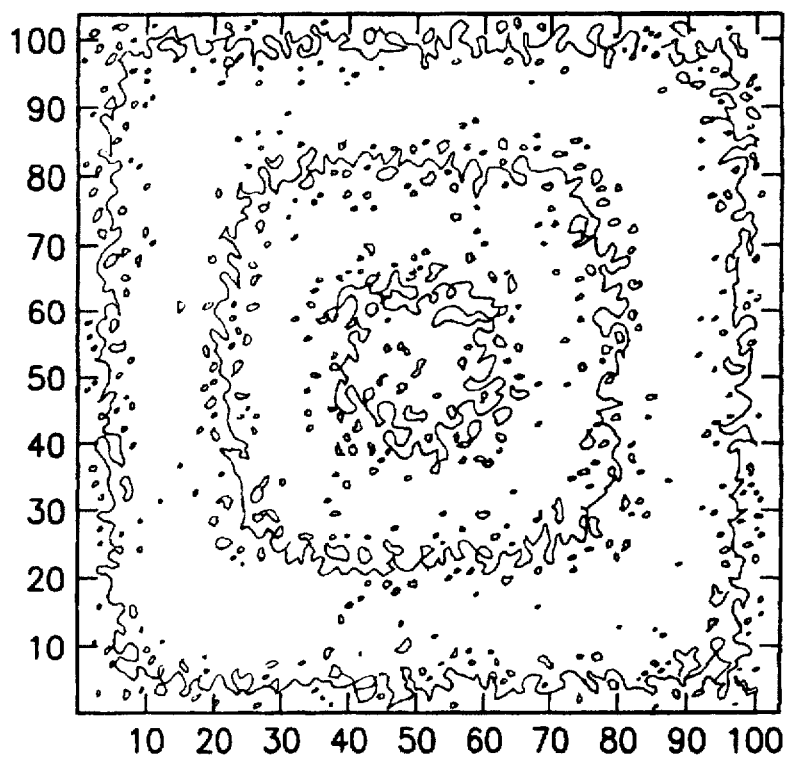
FIG.8B2

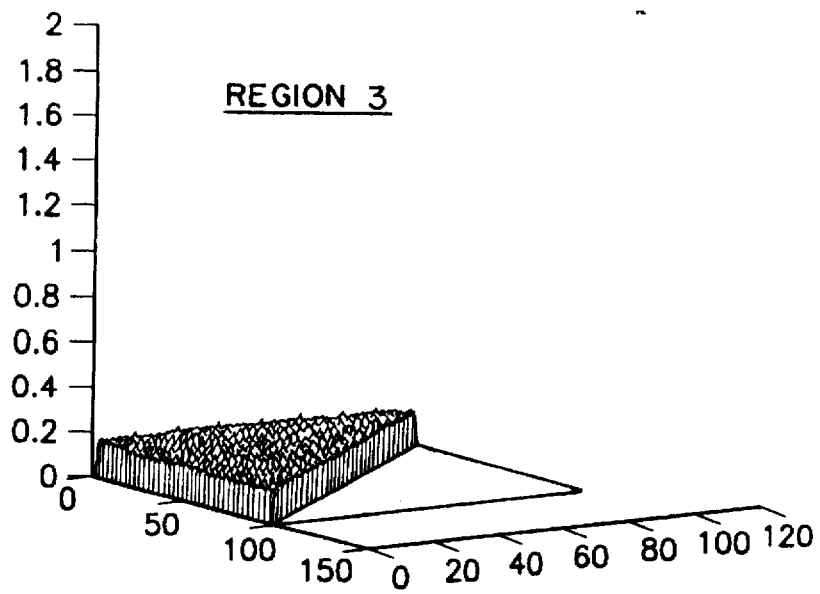
FIG.8A3
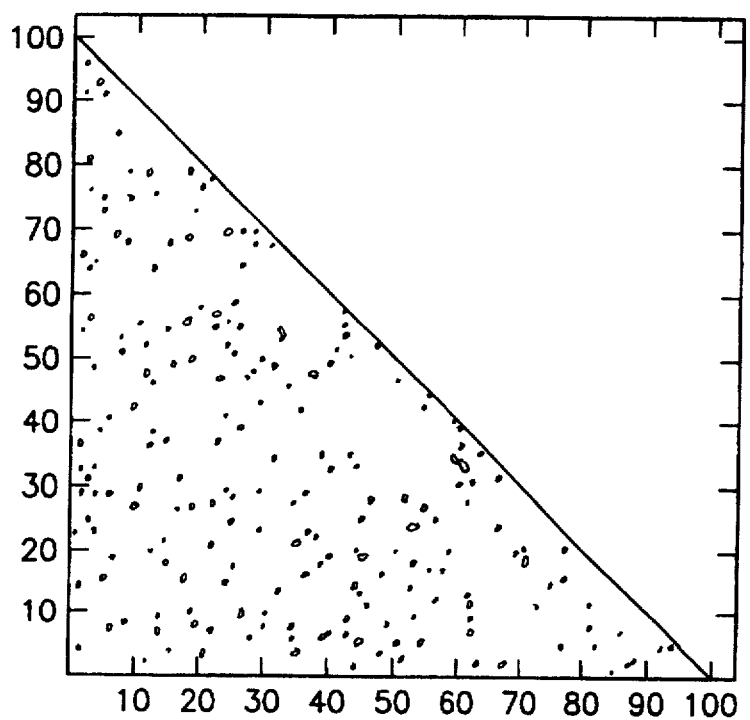
FIG.8B3

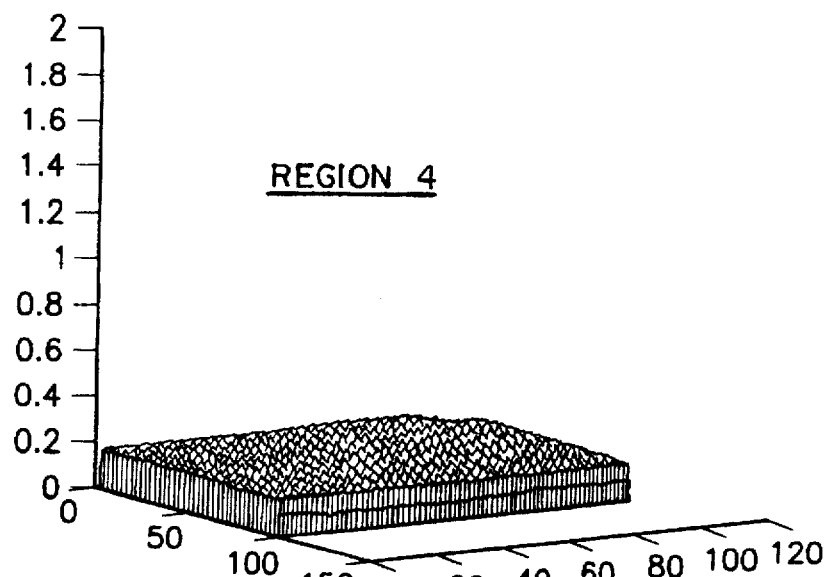
FIG.8A4
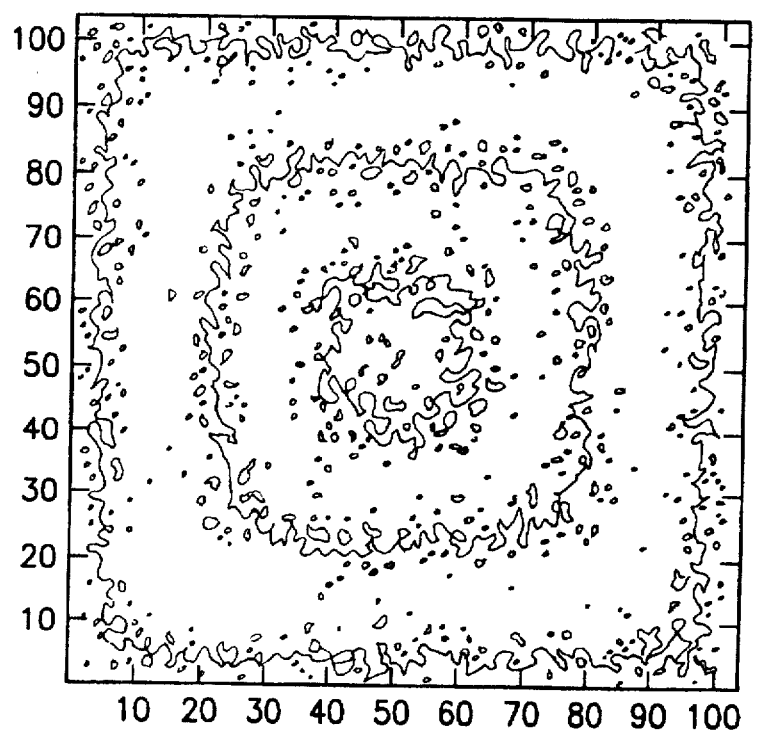
FIG.8B4

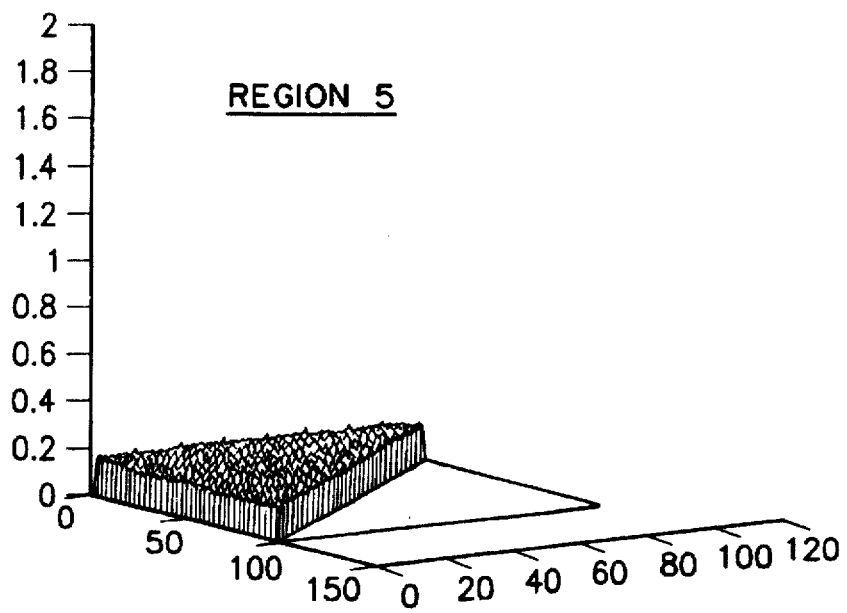
FIG.8A5
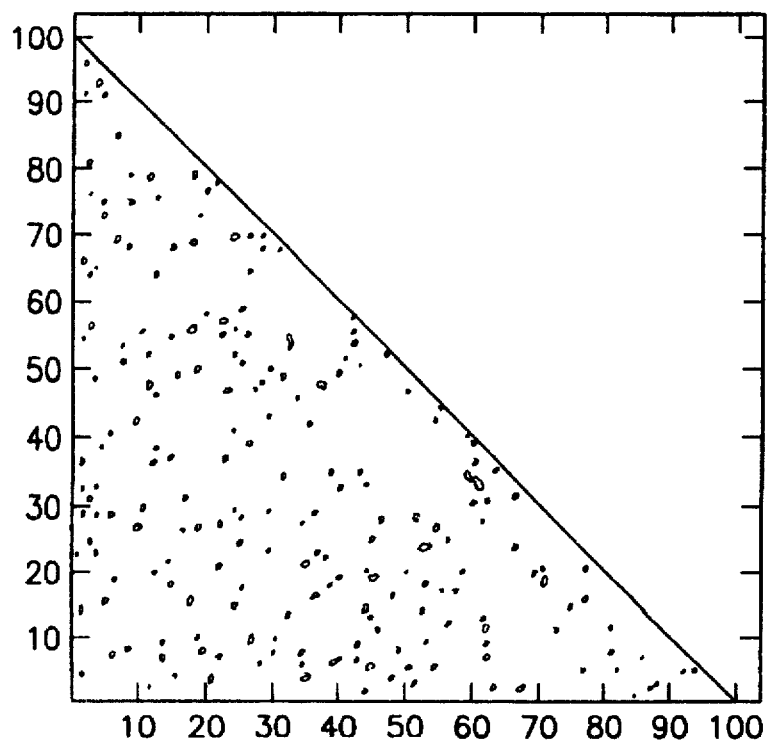
FIG.8B5

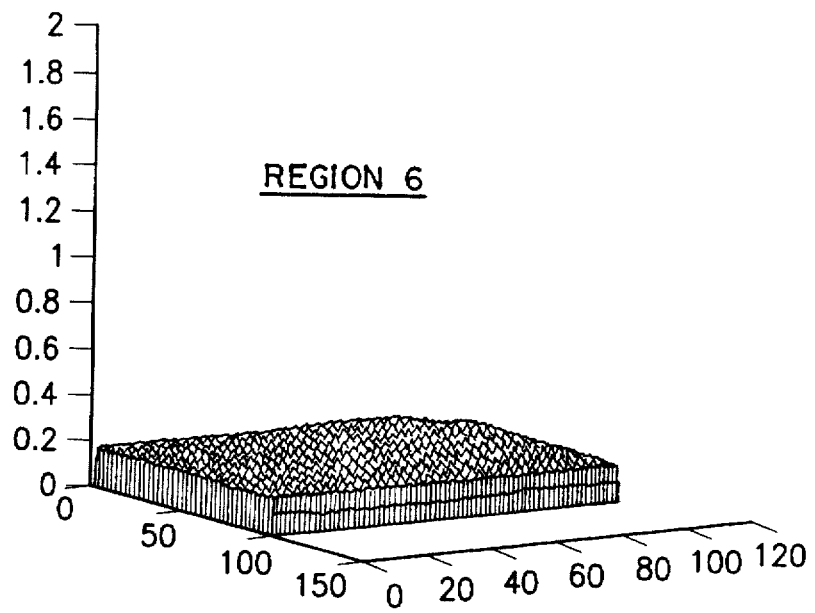
FIG.8A6
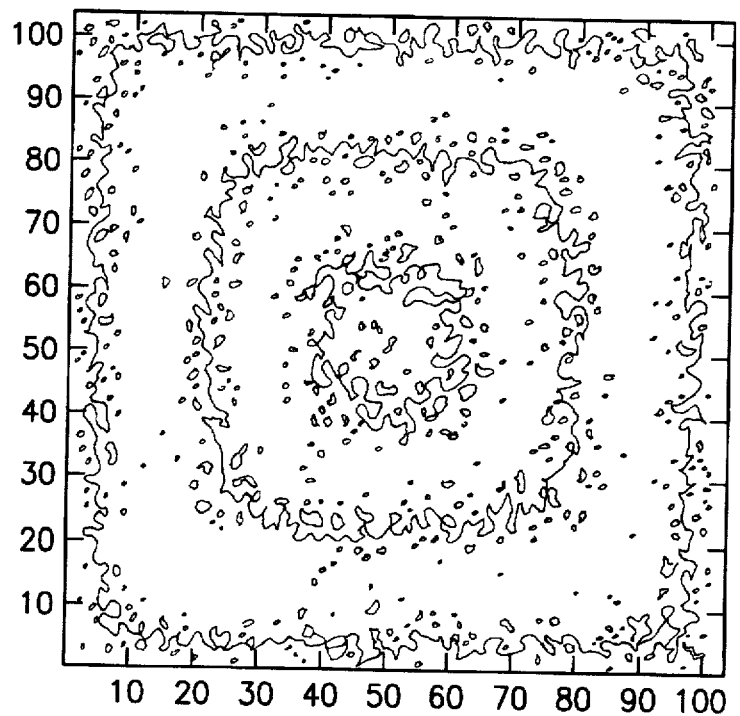
FIG.8B6

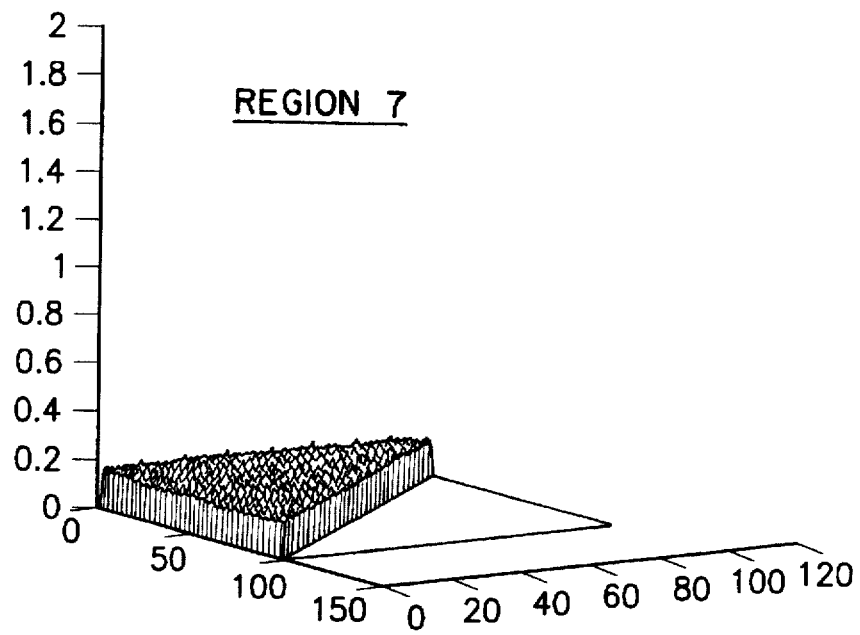
FIG.8A7
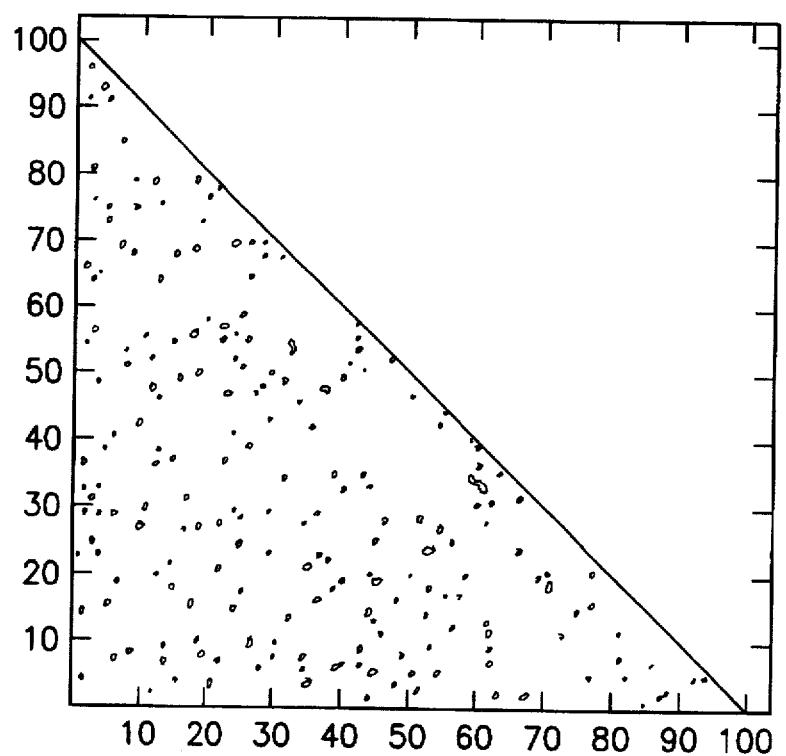
FIG.8B7

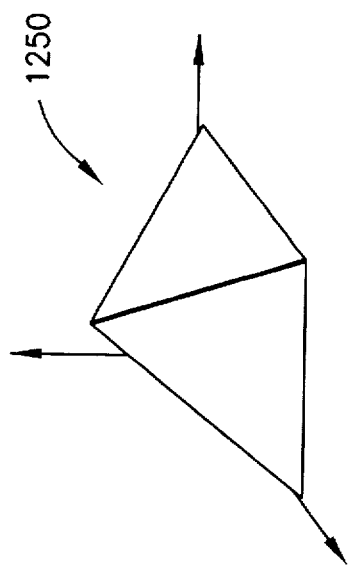
FIG.12A 1200
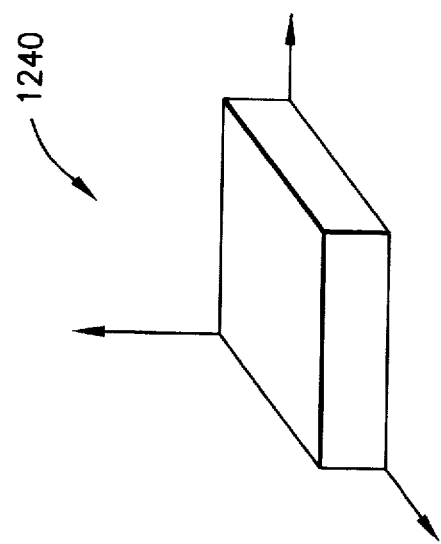
FIG.12B 1240
FIG.12C 1250
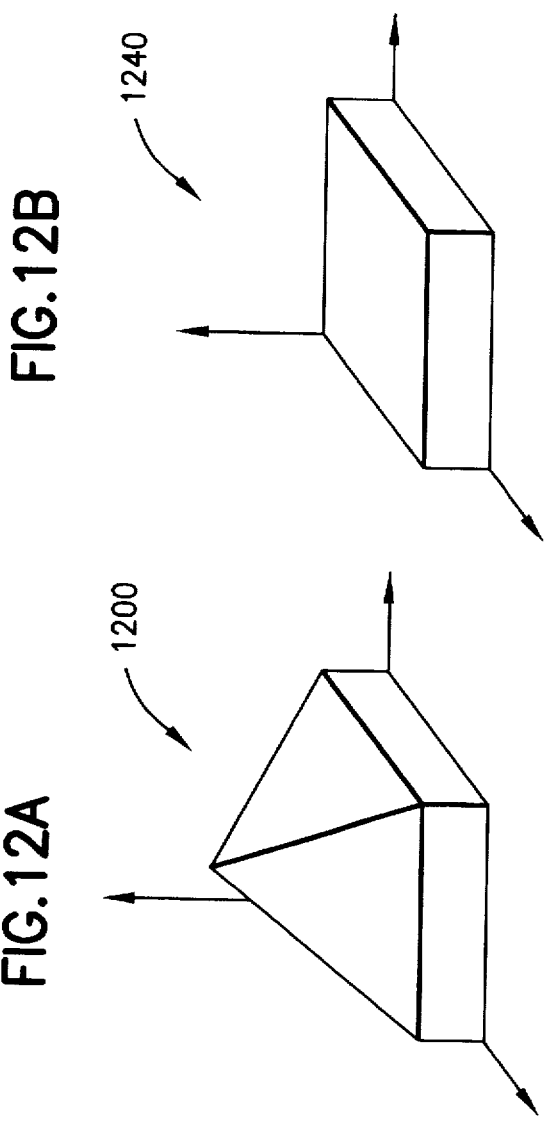
FIG.13A 1250
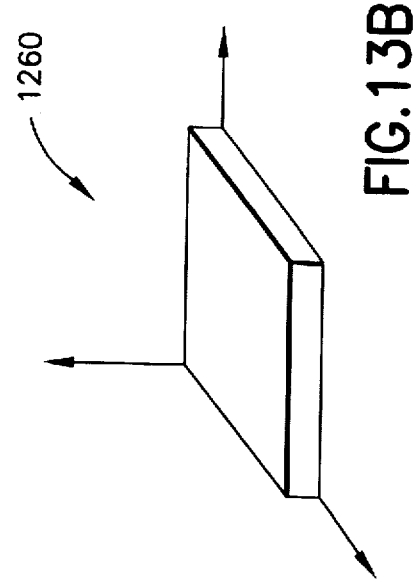
FIG.13B 1260
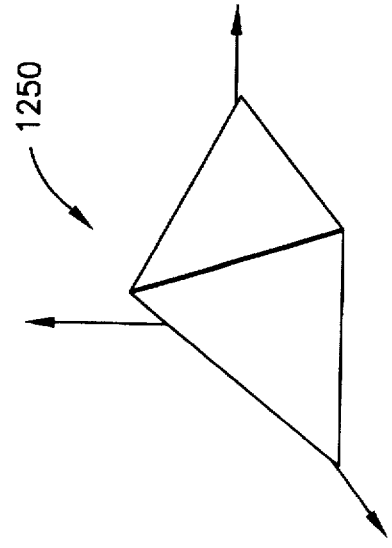

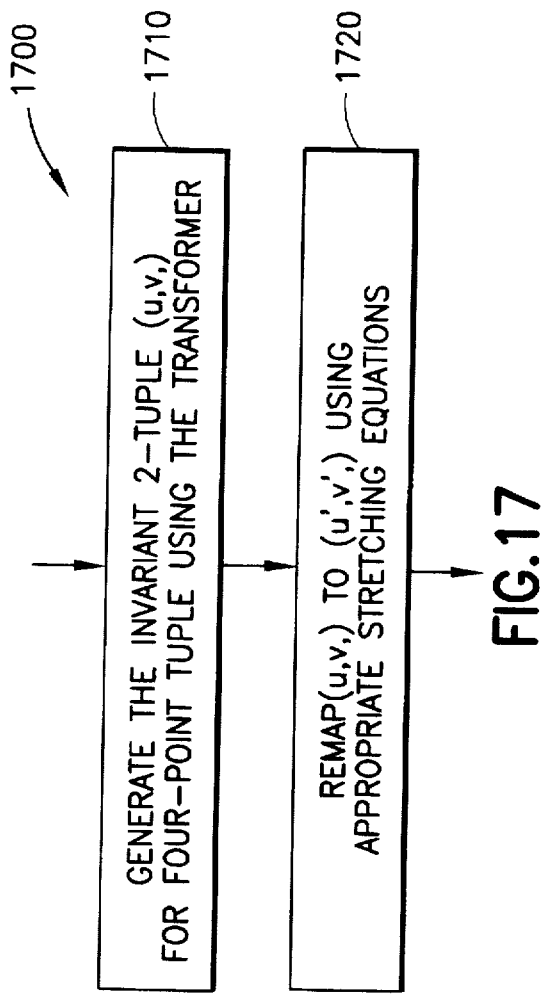
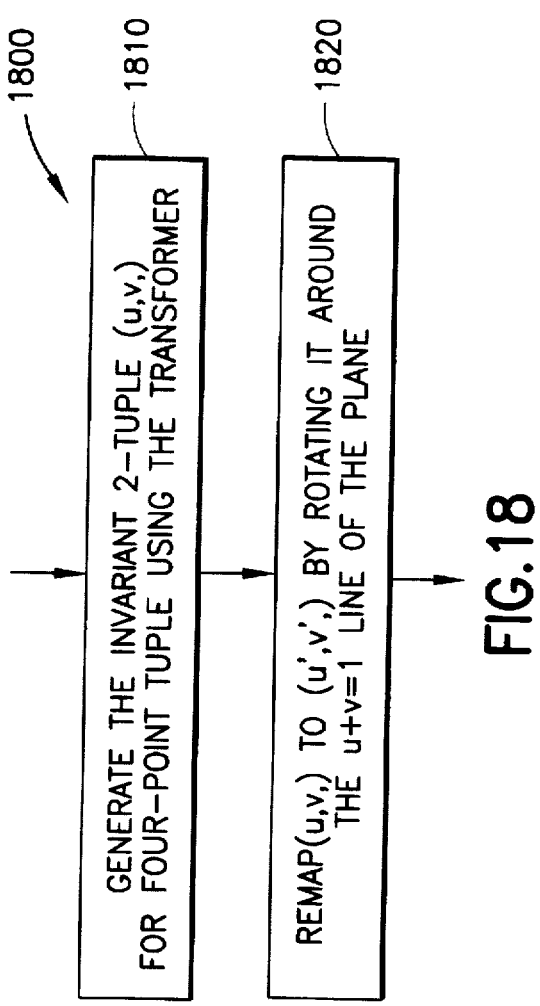

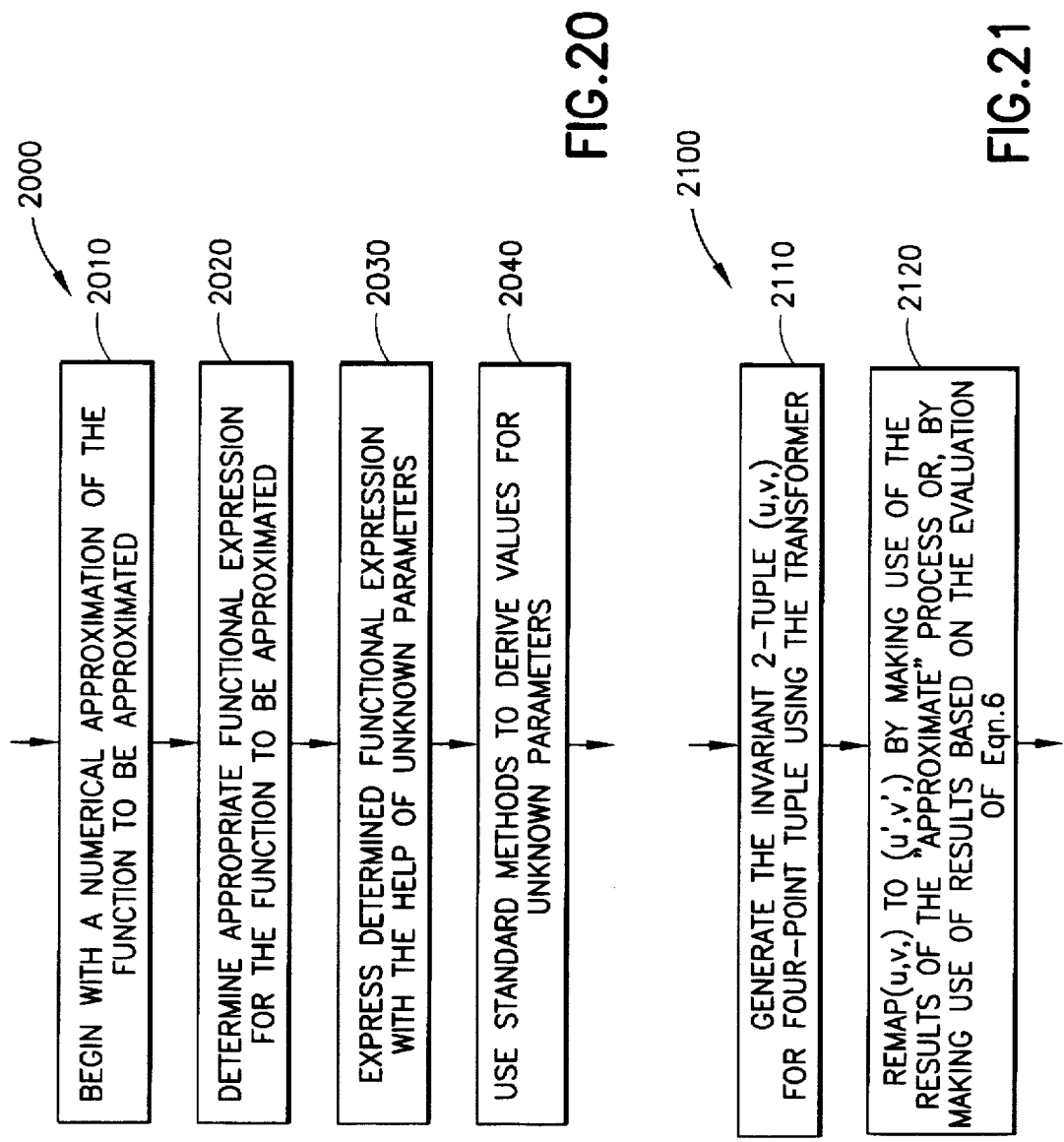

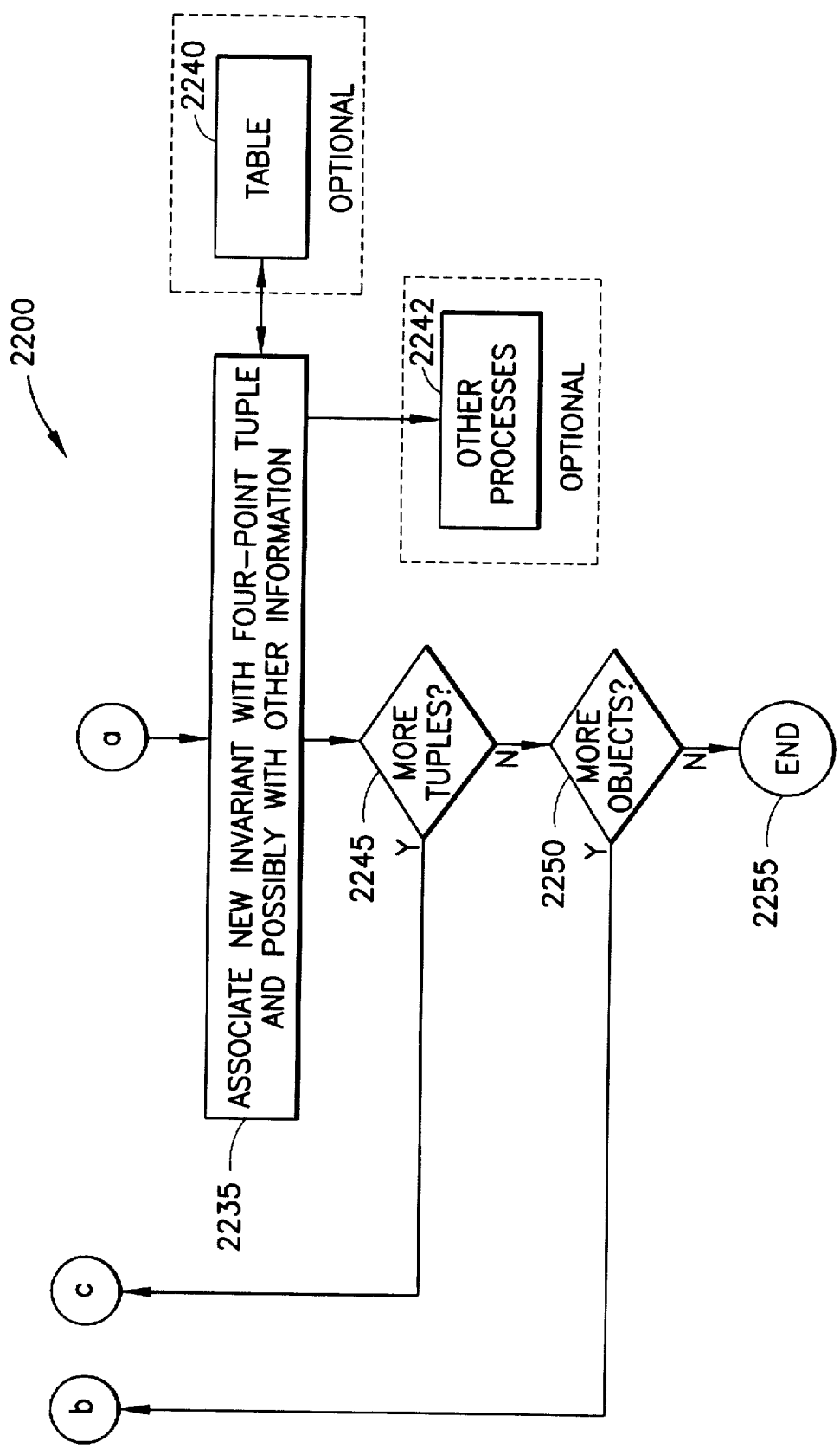

FIG. 24

| | INDEX INFORMATION | INFORMATION 2320 | | | | | | | | | | | | | | | |
|---|---|---|---|---|---|---|---|---|---|---|---|---|---|---|---|---|---|
| 1 | | | | | | | | | | | | | | | | | |
| 2 | | | 2312 | 2312 | | | | | | | | | | | | | |
| ... | | | 2312 | 2312 | 2312 | 2312 | | | | | | | | | | | |
| K | u', v', ... | 2312 | 2312 | 2312 | 2312 | 2312 | 2312 | | | | | | | | | | |
| | | 2312 | 2312 | | | | | | | | | | | | | | |
| | | 2312 | 2312 | 2312 | 2312 | 2312 | | 2312 | 2312 | | | | | | | | |
| | | 2312 | 2312 | 2312 | 2312 | | 2312 | 2312 | | | | | | | | | |
| | | 2312 | 2312 | 2312 | | | | 2312 | 2312 | 2312 | | | | | | | |
| | | 2312 | 2312 | | | | | | 2312 | 2312 | 2312 | | | | | | |
| | | 2312 | | | | | | | | 2312 | 2312 | 2312 | | | | | |
| | | | | | | | | | | | 2312 | 2312 | 2312 | | | | |
| ... | | | | | | | | | | | | | | | | | |
| | | 2312 | 2312 | 2312 | 2312 | | | | | | | | | 2312 | 2312 | 2312 | 2312 |

FIG.25

TWO-DIMENSIONAL AFFINE-INVARIANT HASHING DEFINED OVER ANY TWO-DIMENSIONAL CONVEX DOMAIN AND PRODUCING UNIFORMLY-DISTRIBUTED HASH KEYS

CROSS-REFERENCE TO RELATED APPLICATIONS

The present application claims priority to co-pending U.S. Provisional application 60/031,613 filed on Nov. 26, 1996, now abandoned.

1.0 FIELD OF THE INVENTION

This invention relates to the design of hashing functions and their use in computer systems and applications programs executed by those systems. More specifically the invention relates to two-dimensional, affine-invariant hashing defined over a convex domain.

2.0 BACKGROUND OF THE INVENTION

The use of hashing techniques in the context of database access has been known for quite a number of years. During the last decade, hashing as a class of algorithms has been enjoying enormous popularity among researchers specializing in access methods for very large databases. The word hashing has been used interchangeably with the word indexing in the literature; it will also be the case with the text of this document.

The main components of any hashing scheme as applied to the context of database retrieval are the following:

a. an invariant-producing function (also commonly known as "hashing function") that operates on the objects that are to be stored in the database and later retrieved; The invariant-producing function makes use of various characteristics, and/or properties, and/or attributes in general of the objects and produces a tuple of one or more numbers that remain invariant under a well-defined set of transformations that the objects of the database are allowed to undergo. The tuple of invariant numbers can then be used to derive indices into a specific location of b. a table (also commonly known as a "hash table"); the table is a collection of buckets (of fixed or variable capacity) each of which is populated with zero or more entries pertaining to objects of the database. Given an object, the invariant-producing function is evaluated one or more times for the object and one or more tuples generated: for each generated tuple, a bucket in the table is identified and an entry is made with information relating to the object under consideration.

The table of the hashing scheme is in essence a lookup table that is populated during an off-line storage phase during which the various objects to be recognized are processed and stored in the table (database). The dimensionality of the lookup table is the same as the dimensionality of the hashing function, i.e. equal to the cardinality of the tuple that the hashing function produces. Also, instead of producing invariants that can be used to generate indices into the hash table, the hashing function can be seen as directly producing indices into the hash table. This duality of the hashing function semantics will be used frequently in the discussion that follows.

Subsequent to the storage phase, the table allows fast (on-line) access to information about the objects that are stored in the database, in the following manner: when presented with an object whose identity is sought, the invariant-producing function is evaluated one or more times for the query object and the respective bucket(s) of the table accessed; all entries found in each such bucket are then collected and examined for multiple occurrences of some object's identifier—the query object is then claimed to be that database object with the most number of such entries in the retrieved collection of entries. Clearly, this is a simplified description of the hashing scheme for database storage and retrieval, but it captures the essential elements of the approach.

Although hashing techniques perform sufficiently well with databases of small sizes (tens of thousands of data records), it is becoming increasingly evident in recent years that one must exercise caution when applying such techniques to very large data sets. In particular, it is true that, with the majority of hashing functions, very large data sets result in the statistical properties of such functions to become apparent in the patterns of occupancy of the buckets of the hash table, independent of the table's dimensionality.

In the middle of the last decade, hashing functions based on geometric characteristics of the database objects were proposed for searching databases. In particular, in the context of model-based object recognition, a technique known as "geometric hashing" has been adopted by many researchers in recent years. In geometric hashing, a two-dimensional and continuous hashing function is being used to allow recognition (retrieval) of two- and or three-dimensional objects from a database of known objects.

Ever since then, model-based database retrieval has been gaining popularity and has made its way to designs and implementations of store and retrieve schemes in a variety of scientific fields. In the context of computational biology, hashing functions have been devised for attacking computationally intensive problems, such as non-exact string matching, surface matching in ligand-receptor interaction, and substructure matching of 3D molecular structures. The dimensionality of the employed hash tables ranges from 3 to 8 dimensions depending on the particular task at hand.

Finally, in the domain of the chemical database information retrieval, several systems have been built to store and retrieve data about chemical structures, the data ranging from physical and chemical properties of the structures, to toxicity information, clinical trial results etc. A large number of those systems use hashing functions that are based on geometrical properties, chemical type or other structural relations of the stored chemical entities.

In all of the above mentioned fields, researchers have realized that one of the main characteristics of the used hashing functions is the non-uniform distribution of the values produced by the hashing function over the space of invariants. This non-uniformity becomes particularly evident when the number of stored items in the database is very large. It has been observed that this non-uniformity is not specific to a particular data type but instead is endemic to all access methods that are based on hashing.

This non-uniformity of the distribution of values over the space of invariants has a number of interesting and important ramifications that directly reflect on the behavior and performance of any system that uses it. From a theoretical standpoint, it is important to know the range of values generated by the hash function. Related to this, the frequency of appearance of an invariant value allows one to draw conclusions about the discriminating power that the value (equivalently: the respective index), and thus the hashing function, carries.

Also, it is conceivable that certain hashing functions may give rise to multimodal distributions in the space of invariants: each one of these modes will correspond to a region of the hash table with a very large expected number of entries. It is important to locate such regions of the hash table, as well as the occupancy pattern in the neighborhood of these buckets. As a matter of fact, it has been shown in previous work, that the knowledge of the distribution of values over the space of invariants is instrumental to the development of Bayesian approaches to database access in the presence of noisy data inputs.

From a practical standpoint, the non-uniform distribution over the space of invariants results in different lengths for the lists of hash table entries that are associated with each of the hash table buckets. Since the length of the longest such list reflects on the time needed to process the data during a query, a non-uniform distribution will adversely affect the performance of the respective system. On the other hand, a uniform distribution not only will reduce execution time but can also result in a much more efficient storage of the hash table data structure.

Lastly, in parallel realizations of such storage and retrieval systems, a more or less constant occupancy of all the hash table buckets will result in an improved load balancing among the processors.

To this point, there appears to exist very little published work on determining quantitatively and/or qualitatively the index distributions that one can anticipate. Also very little work exists that attempts to alleviate the problem of the resulting non-uniform occupancy of the hash table bins. Four different approaches can be identified.

First, one can increase the dimensionality of the invariant-producing function, thus effectively decreasing the average number of entries in a given bucket of the employed table. Second, database-specific heuristics may be employed to improve the occupancy pattern of the table buckets.

A third class of approaches comprising a mix of techniques assumes knowledge of the arrival order of the various queries, or the existence of a restrictive architecture such as a shared-memory multiprocessor etc.

Indeed, a large number of approaches have taken the view that multidimensional data can be transformed in a stepwise manner to one-dimensional representations and thus traditional access methods can be used for their manipulation. The R-tree data structure is among the first approaches that use this idea. A variation known as the hB-tree can become unbalanced and in fact acquire a severe skew with direct impact on performance.

Along similar lines, Gray coding has also been used as the technique for the mapping of multidimensional data to one-dimension; this variation can alleviate the problem to an extent but a certain degree of non-uniformity still persists. It should be stressed here that the use of Gray-encoding does not address the issue of modifying the hashing function but rather the way the corresponding multidimensional lookup table can be treated as one-dimensional and traversed using traditional access methods. Peano and Hilbert curves have also been employed in the same context. In general, such mappings can be successful if the type of the queries is known a priori and if the query path demonstrates locality. An implicit assumption with these techniques is the uniformity of the occupancy pattern of the various table buckets. More recently, the concept of the fractal dimension was proposed as the means to describe the deviation from uniformity, but all reported results have been for rather small sets (approximately 80,000 entries) of sample two-dimensional data.

It can been argued that existing methods may not be suitable for accessing databases by making use of an objects' geometric data because all such methods are based on data structures designed for one-dimensional data.

Kamel and Faloutsos found experimentally that secondary memory is up to two orders of magnitude slower than primary memory. This causes most operations to be bound by the input/output (I/O) subsystem's response time. The natural solution is to attempt to parallelize the involved data structures, such that accesses can be serviced by several units: examples include separate disks on a single processor, a multiprocessor machine with several disks etc. Hierarchical (multi-step) access schemes can prove useful in this context. Alternatively, and when dealing with shared-memory multiprocessor systems, the data structures can be shared among a number of processors and storage devices, with a single association structure maintained in shared memory.

Finally, a fourth possible route, makes implicit or explicit use of irregular tessellations of the space of invariants. Beginning with the knowledge of an actual invariant-producing function to be used with a database, expressions are derived for the distribution of bucket occupancy over the space of invariants. The derived distribution is appropriately exploited. During a first stage, the probability density function for the invariants produced by the invariant-producing scheme is determined: this can be done either via a parametric estimation step, or, whenever possible, through the computation of a closed form expression for this density function. Once knowledge of the probability density function is available, well-defined methods from probability theory can be used to redesign the invariant-producing function so that it exhibits the desired properties.

It should be stressed that the concepts discussed herein become issues indeed when large databases are considered. Of course, the semantics of "large" is dependent on the scheme that is used for the database store and retrieve operations. In essence, a database is large when the number of entries in the database generates an occupancy distribution over the buckets of the table which exhibits statistical behavior.

3.0 PROBLEMS WITH THE PRIOR ART

All of the suggested approaches that made use of geometric information, the latter pertaining to the set of recognizable models, to produce the invariants to be used as indices in an indexing-based store-and-retrieve scheme have a number of shortcomings. In particular, the main characteristic in all cases is the non-uniform distribution of preferences for the range of possible index values. As already stated in the previous section, this non-uniformity becomes particularly evident with large databases. Using increasingly larger databases is a trend that characterizes today's database-oriented activities.

The ramifications of this non-uniform preference for certain values of the invariants are numerous and diverse. For example, such a non-uniformity requires the creation and maintenance of tables that will contain a potentially large number of empty or near-empty bins. Given that for a number of important applications (e.g. protein and dna sequence matching, conformationally-flexible substructure matching in databases of 3D molecular information, etc.) the sizes of the respective tables are larger than the maximum file size permitted by a file system, such tables will have to be shared among a number of storage devices. The devices that will be assigned the partition of the table that corresponds to the least-occupied buckets will also share less of the disk I/O burden that a query or a storage operation would incur; a uniformly-occupied hash table would clearly alleviate this situation.

Frequently, and in an effort to improve the database system's response time, the retrieval system's computational burden is shared among a number of processors which also share the respective tables among themselves; the incurred computational burden on a given processor depends on the number of items stored in the buckets of the table that the processor controls. A non-uniform occupancy of the table's buckets will result in excessive workload for some of the processors, while other processors will remain quasi-idle most of the time. This is clearly a situation where load-balancing cannot be achieved in a straightforward manner and additional effort is required.

Another issue has to do with the power to distinguish among the various objects in the database. This discrimination power is implicitly built into the invariant that is used to represent the various objects. If a large number of the buckets of the used table are empty or near-empty, this implies that invariants for the plurality of the objects of the database are now shared by a larger number of objects, and representations for these objects now exist in a smaller number of buckets that are fuller than they should be: the various database objects cannot be distinguished from one another as well as they would have been had the invariant producing functions not preferred some of the buckets over others. A rough analogy to this is the attempt to distinguish among the cars in a parking lot using their color: if no color shades are used, then a sherwood-green and an isle-green car would not be distinguishable. The invariant producing function could have resulted in more discrimination power had color shade been also used.

Finally, if an invariant-producing scheme results in invariants that show no preference for certain values over others, then for a random mix of objects in the database the number of entries in any table bucket is expected to be constant within a tolerance. Any deviations from this "average occupancy" reflect biases in the form of over-represented substructures in the database objects. These substructure could be in the form of feature-point configurations, surface patches, etc. By examining the entries in those buckets that contain more than the expected average of entries, objects can be identified which share the substructures that are over-represented. This allows us to draw general conclusions about the nature of the objects of in the database and either assert or refute claims about the database's composition.

A large number of systems have been built that make use of a specific class of hashing functions. All of the hashing functions in the class make use of geometric characteristics of the objects to be recognized, and are different for the different types of allowed transformations—rigid transformation (=rotation plus translation), similarity transformation (=rotation plus translation plus scaling), affine transformation. This class of hashing functions was proposed for its simplicity, and its property of continuity in the space of invariants. All of the functions in the class have as their domain the space $R^{2n}$, where n is the number of features for which the invariant in generated, and as range the $R^2$ (the Cartesian plane) of invariants; in what follows the domain of the hashing function will be referred to as the "feature domain," whereas the range of the hashing function will be the "space of invariants." Notice that each of the produced invariants can range from −Infinity to +Infinity, a property that can cause problems when implementing systems. Specifically, the table for storing the invariants can only consider a finite extent part of the entire space of invariants, and is thus forced to ignore a potentially large number of otherwise valid table entries just because the respective invariants fall outside the region under consideration. There have been suggestions in the past to "fold" the infinite space of invariants onto the finite-extent region that is being considered by the table, but these approaches suffer from different shortcomings.

In the vast majority of the systems, the object features originate in a feature domain that is assumed to be bounded, for example, a square, or a circle. In particular, square feature domains are the overwhelmingly preferred ones. In terms of the employed transformation, the 2D affine transformation has been usually selected because of its generality and the flexibility it exhibits. It is worth mentioning at this point that the 2D affine transformation is the most general transformation of points on the plane. The 2D affine transformation is also known as the 2D linear transformation and the two terms are used interchangeably in this discussion.

Given four feature-points (four-point tuple) on the plane, all belonging to one of the recognizable models, a tuple of two numbers (2-tuple) that will remain invariant under any affine transformation of the four-point tuple can be produced in the context of the geometric hashing as follows:

$$p_4 - p_1 = u(p_2 - p_1) + v(p_3 - p_1) \qquad 1$$

In this equation, $p_i = \{x_i, y_i\}$ represents the position vector of the i-th point of the set; u and v are numbers that will remain invariant if the four-point tuple is subjected to a 2D affine transformation. Notice that through this equation, the vector connecting the first and fourth point of the tuple is expressed as a linear combination of the vectors connecting points 1 & 2, and points 1 & 3 respectively. This equation in essence represents a remapping function that maps the four-point tuple of the feature domain (in this case $R^{2*4}$) to a 2-tuple in the space of invariants ($=R^2$). FIG. 1 graphically depicts this remapping.

The 2-tuples that are produced for each four-point tuple that can be formed using features from a recognizable object can be used to derive indices to a table where information about the four-point tuple under consideration and the corresponding object can be stored. The 2-tuples and the respective indices can be used in a lookup-table scheme to initially store and later retrieve information pertaining to a given recognizable object. This way of using the 2-tuples has been used extensively to carry out recognition of two-dimensional objects by computer-based systems among others.

This table can be constructed off-line by examining each of the objects of the database in turn; the table can subsequently be used as a lookup (=hash) table during an on-line stage to retrieve those objects of the database of recognizable objects that have a subset of features in common with a query object. In particular, given a query object, its features are identified by means of standard techniques, and the above equation is used to generate invariant 2-tuples for four-point subsets of the query object's features. Each of the generated invariants is then used to identify (index into) a bucket of the lookup table; each such bucket contains entries referring to objects of the database that contain subsets of features generating the same invariant 2-tuple. Each generated four-point tuple from the query object is then compared against each of the four-points set identified by the respective bucket's entries to hypothesize an affine transformation that will transform one set onto the other. The database object that is supported by the largest number of consistent hypothesized affine transformations is the one that matches the query object best, under an affine transformation regime. One or more other objects may partially match the query object under an affine transformation and these will generate a correspondingly smaller number of consistent hypothesized affine transformations.

The above description is in essence at the core of every store-and-retrieve database system that is built around an indexing scheme. In the case where the indexing scheme makes use of geometric information, it is called "geometric hashing" and detailed descriptions of it exist in the reported bibliography. For more details, the reader can refer to the 1988 paper by Lamdan and Wolfson from the referenced literature.

The above equation however has a certain undesirable property that becomes evident when the database contains a number of objects that is large enough for statistical behavior to be exhibited. In detail, if the points comprising the four-point tuple are drawn uniformly from a convex domain K, then the probability that the produced 2-tuples reside in the 3rd quadrant of the space of invariants (i.e. $u<=0$ and $v<=0$) is very low, (quasi-) independently of the shape of the convex domain K! In an analogous manner, the produced 2-tuple could reside in any of the remaining three quadrants of the space of invariants with equal probability, and again (quasi-) independently of the shape of the convex domain K! This is a little known but published result. This result has severe consequences, as the discussion above has already indicated.

Using Monte-Carlo simulation to generate a large number of four-point tuples, with the points being uniformly distributed over a convex domain (in particular, a square), an invariant 2-tuple is generated for each four-point tuple and a counter is updated at the location of the bucket corresponding to the invariant. The buckets are defined by appropriately tessellating a finite-extent region of the space of invariants: if a generated invariant 2-tuple falls outside the region under consideration no counter is updated; otherwise, each of the two members u and v of the tuple is quantized and assigned to the corresponding bucket. The total number of four-point tuples is also kept track of during the process. Upon completion of the simulation, each of the counters is divided by the total number of the generated four-point tuples and the resulting values form a discretized version of the probability density function for the values u and v. Computing the Riemann sum over the finite-extent region delineated by the table gives the total probability of a generated 2-tuple to reside in the region under consideration. The value of the probability density function at a given location is a direct estimate of the preference for producing 2-tuples that fall within the space-of-invariants region that corresponds to the bucket.

FIG. 2 is a prior art drawing showing the mesh (FIG. 2A) and the contours (FIG. 2B) of the probability density function for the u and v produced by the above equation, and for a finite part of the space of invariants. The depicted region contains a little over 90% of all possible 2-tuple combinations that the equation can generate. The depicted probability density function was obtained via a Monte-Carlo simulation and directly indicates the preference of the generating equation for certain 2-tuples over others. The probabilities of a 2-tuple residing in a given quadrant for the case of four-point tuples that are uniformly distributed over a square domain K were proven by this author to be: Pr(1st quadrant)= $133/432$, Pr(2nd quadrant)=$133/432$, Pr(3rd quadrant)=$11/144$, Pr(4th quadrant)=$133/432$. The proofs rely on the answer to the famous Sylvester's Vierpunkt problem from geometric probability. Similarly, if the four-point tuples are uniformly distributed over a disc-shaped domain K, the respective probabilities are: Pr(1st quadrant) = $\frac{1}{3}-35/(144\pi^2)$. Pr(2nd quadrant)=$\frac{1}{3}-35/(144\pi^2)$, Pr(3rd quadrant)=$35/(48\pi^2)$, Pr(4th quadrant)=$\frac{1}{3}-35/(144\pi^2)$. As can be seen in both cases, the probability of a 2-tuple residing in the third quadrant is very small and approximately equal to 0.07 in both cases, a rather small value indeed. This lack of preference for the third quadrant remains even if the convex domain K is a triangle, convex polygon, or an ellipse.

Notice that in neither case did we specify the actual side of the square, or the radius of the disc; indeed, the affine transformation incorporates scaling in it and the above results hold independently of the length of the side of the square, or the radius of the disc.

Moreover, it should be noted that this is a much more general result: although the Monte-Carlo simulation generated four-point tuples by drawing them uniformly from a square or a circular domain, this property holds for triangular, any polygonal of order 5 or higher, and elliptical domains as well.

In the light of the discussion above, it is evident that for the case of affine transformations and feature points that are uniformly distributed over any convex domain K, the use of the invariant-producing function that is dictated by the geometric hashing framework is a suboptimal choice. Furthermore, the probability density function for the invariant values u, and v has a shape that makes it not amenable to treatment by standard techniques. Clearly, a new way for producing invariant 2-tuples is needed.

An alternative affine-invariant producing equation was suggested by Ambartzumian: given four feature points (four-point tuple) on the plane, a tuple of two numbers (2-tuple) that will remain invariant under any affine transformation of the four-point tuple can be produced in the following manner:

(a) $u=A_{234}/C_{1234}$ $v=A_{134}/C_{1234}$ if pt 4 interior to triangle 1-2-3
  (1-2-3-4 non-convex)

(b) $u=A_{123}/C_{1234}$ $v=A_{134}/C_{1234}$ if pt 4 exterior to triangle 1-2-3
  (1-2-3-4 convex)   2

Here, $A_{ijk}$ represents the area of the triangle whose vertices are the points $p_i$, $p_j$, and $p_k$ respectively. Similarly, $C_{1234}$ is the area of the convex hull of the polygon that the four feature points $p_1$, $p_2$, $p_3$, and $p_4$ define. Note, that if the quadrilateral formed by the four points is convex, its area will be equal to $C_{1234}$. On the other hand, if the quadrilateral in non-convex, there exists a set of three vertices such that the area of the triangle formed by these vertices is equal to $C_{1234}$ (see Eqn. 2). In the case where the quadrilateral is nonconvex and point $p_4$ is not interior to the triangle formed by the other three points, then a simple relabeling of the four vertices suffices to reduce the case to that of (a) in Eqn. 2. Additionally, it is easy to show that the u and v defined by this last equation are invariant with respect to 2D affine transformations of the respective four-point tuple. Furthermore, it is clear that, unlike the 2-tuples produced by the geometric hashing equation, the 2-tuples produced by this scheme assume values that range between 0 and 1. As such, the space of the invariants produced by this latter equation is the square $[0,1] \times [0,1]$.

FIG. 3A is a prior art drawing outlining the various regions that are used in the computation of Ambartzumian's affine invariants, for four points forming a convex quadrilateral. Recalling the equation that produces the affine invariant 2-tuple (u, v) as a ratio of areas, we can see that in the case where the four-point tuple forms a convex quadrilateral, the denominator $C_{1234}$ is equal to the area of the quadrilateral 1-2-4-3-1. Analogously $A_{123}$ is equal to the area of the shaded triangle 1-2-3-1, whereas $A_{134}$ is equal to the area of the shaded triangle 1-4-3-1.

FIG. 3B is a prior art drawing outlining the various regions that are used in the computation of the Ambartzumian affine invariants, for four points forming a non-convex quadrilateral. As above, it is easy to see that in the case where the four-point tuple forms a non-convex (reentrant) quadrilateral, the convex hull of the set of four planar points is delineated by a subset of three of the points. In the particular arrangement shown here, points 1, 2, and 3 define the convex hull of the four-point set. In this case, $C_{1234}$ is equal to the area of the triangle 1-2-3-1; moreover, $A_{234}$ is equal to the area of the shaded triangle 2-4-3-2, whereas $A_{134}$ is equal to the area of the shaded triangle 1-4-3-1. If the point 4 lies in any of the dot-shaded infinite regions then simple exchange of its label with that of the point at which the region is rooted reduces the case to the one where 4 is interior to the triangle formed by the points 1, 2, and 3 and branch (a) in Eqn. 2 above is used.

Recapitulating, and as per the suggestion by Ambartzumian, four points of the feature domain can be remapped to a point of (a two-dimensional) invariant space by means of ratios of areas. The members of the affine-invariant 2-tuple assume values that can range from 0 to 1. I.e. all of the four-point tuples are mapped to a point inside a unit square of the space of invariants. FIGS. 4A and 4B are a prior art representation of precisely this mapping. Without loss of generality, the feature domain is chosen to be the unit square.

Let us assume that we are presented with the four points of a four-point tuple. The first three points of the four-point tuple (which, without loss of generality, are assumed to be non-collinear) divide the plane on which all four points lie into seven distinct regions; the fourth point of the four-point tuple can reside in any of these seven regions. FIG. 5 is a prior art representation of exactly seven regions in which any three non-collinear planar points divide the plane. These seven regions can be numbered in an arbitrary manner. In this discussion, the numbering scheme shown in FIG. 5 will be used. Any other scheme for numbering the seven regions could have been employed instead and the results would still hold.

The seven regions in which the first three points of the four-point tuple subdivide the plane are distinguished by several properties. In particular, and for the numbering scheme used in this discussion, if the fourth point of the four-point tuple lies in an even-numbered region, then the formed quadrilateral is convex; the four-point tuple is then said to be in a convex-quadrilateral (=CQ) arrangement. On the other hand, if the fourth point lies in an odd-numbered region, then the formed quadrilateral is non-convex; the four-point tuple is then said to be in a non-convex-quadrilateral (=NCQ) arrangement. In FIG. 5, the even-numbered regions (CQ arrangements) are shown with a darker shade than the odd-numbered regions (NCQ arrangements).

Another property pertaining to the seven regions shown in FIG. 5 has to do with values of u and v produced by the respective arrangements of the four points. In particular, if the four-point tuple is in an NCQ arrangement it can be shown easily that the produced u and v satisfy the following inequalities:

$$u>=0, v>=0, u+v<=1 \qquad 3$$

The last inequality implies that all of the produced 2-tuples will be confined to the triangle formed by the points (0,0), (1,0) and (0,1) of the space of invariants. In an analogous manner, if the four-point tuple is in a CQ arrangement, it can be shown that the produced u and v satisfy the following inequalities:

$$u>=0, v>=0, u<=1, v<=1 \qquad 4$$

This time, all of the produced 2-tuples can lie anywhere inside the square formed by the points (0,0), (1,0), (1,1), and (0,1) of the space of invariants.

FIG. 6 is a prior art representation of where, in the space of invariants, the invariants produced by a randomly selected fourth point map for each of the seven possible regions of FIG. 5. FIG. 6 in essence depicts the two sets of inequalities described above. The odd-numbered regions satisfy the first set of inequalities and thus the respective 2-tuples lie in the shaded triangle shown at the top right of the Figure. The even-numbered regions satisfy the second set of inequalities and thus the respective 2-tuples lie in the shaded square shown at the bottom right of the Figure.

4.0 OBJECTS OF THE INVENTION

An object of this invention is a system and method for the production and use of a uniform distribution of the invariants produced by the invariant-generating mechanism.

An object of this invention is an improved storage/retrieval system and method that searches a database of objects (e.g. 2D contours, fingerprints etc.) by accessing a uniformly distributed database of object descriptors.

An object of this invention is a system and method for the production and use of a uniform distribution of the invariants with a convex feature domain.

An object of this invention is a system and method for the production and use of a uniform distribution of the invariants with convex feature domains of varying shapes, the feature domains including domains in the shape of a triangle, square, polygon, circle, ellipse.

An object of this invention is a use of the uniform distribution of the invariants to qualitatively assess the nature of the objects in a database.

An object of this invention is a use of the uniform distribution of the invariants to implement a predicate that answers the question of whether a specific feature or set of features is present in a database of one or more objects.

An object of this invention is a use of the implemented predicate to answer the question of whether two sets of objects, each containing one or more objects, share groups of features.

An object of this invention is a use of a uniform distribution of invariants over a feature domain to balance computational load on distributed computer systems.

An object of this invention is a use of a uniform distribution of invariants over a feature domain to balance storage requirements on distributed computer systems.

5.0 SUMMARY OF THE INVENTION

This invention is a method and system for using affine invariants with a uniform distribution over the range of their values, the affine invariants subsequently being associated with features of two-dimensional objects. Each two-dimensional object is defined by a set of object points (i.e. features) selected from an object feature domain like points on a plane, vertices on two-dimensional contours, fingerprint minutiae, etc. The objects are further capable of being transformed by one or more affine (=linear) transformations that include translation, rotation, scaling, and/or shear. The produced invariants and associations can be used to store representations of one or more objects in a database; given a test object new associations between invariants and test object features are made and used to retrieve and compare the test object to one or more of the two-dimensional objects stored in the database, the database being shared among one or more computers or processors.

The affine mappings transform any one of the objects (first object) into another two-dimensional object (transformed object) that is related to the first object but may appear different. For example, a square object can be transformed by shear to appear as a rectangle. Every point contained in the object is transformed by the transformation and a given first subset of points in the set of object points will correspond to a first set of invariant values (invariants) that remain constant under any transformation. Note that a second subset of points in the set of object points will correspond to a second set of invariants.

The invention exploits a discovery, unrecognized by the prior art. A distribution of invariants is produced by selecting a plurality of subsets of four features (a four-point-tuple) from the object feature domain, three of the points being nonlinear and dividing the object feature domain into seven regions, while the fourth point is located in one of the seven defined regions. If the fourth point lies in one of four of the seven regions, the four-point tuple forms a non-convex quadrilateral and the four-point tuple is said to be in a non-convex quadrilateral (NCQ) arrangement. On the other hand, if the fourth point lies in one of the remaining three regions, the four-point tuple forms a convex quadrilateral and the four-point tuple is said to be in a convex quadrilateral (CQ) arrangement.

First, one distinguishes among all possible four-point tuple arrangements. In particular, there can be four types of distinct NCQ arrangements depending on which of the four NCQ-forming regions (these are denoted as 1, 3, 5, and 7 in FIG. 5) the fourth point of the four-point tuple finds itself in. Similarly, there can be three types of distinct CQ arrangements depending on which of the three CQ-forming regions (these are denoted as 2, 4, and 6 in FIG. 5) the fourth point of the four-point tuple finds itself in. The discovery is that:

1. for all four NCQ arrangements, the distributions of invariants are identical;
2. for all three CQ arrangements, the distributions of invariants are identical;
3. for all four NCQ arrangements, the distribution of invariants is uniform (within a tolerance) over a closed (triangular shaped) domain in invariant space and independently of the shape of convex feature domain from which the four-point tuples are drawn uniformly; and
4. for all three CQ arrangements, the distribution of invariants exhibit a point and line symmetry, independently of the shape of convex feature domain from which the four-point tuples are drawn uniformly, and, at the very least, can be approximated.

To exploit this discovery, the invention selects one or more objects, represented by four-point tuples, from the set of objects.

A transformer represents each of the four-point tuples by a 2-tuple that is an invariant under any of the possible affine transformations.

A tagger identifies each of the four-point tuples as:
a. having a specific quadrilateral arrangement (either CQ or NCQ) and
b. having its fourth point in one of the seven regions that the other three points define.

An equalizer remaps the 2-tuples (=points in the two-dimensional space of invariants) by redistributing all of the 2-tuples to create a new distribution of 2-tuples that is uniform over the region of possible values. To do this, various techniques are applied to the region of invariants:

a. flipping 2-tuples corresponding to four-point tuples in NCQ arrangements about a line of symmetry,
b. repositioning 2-tuples corresponding to four-point tuples in NCQ arrangements based on point position, and/or
c. rotating 2-tuples corresponding to four-point tuples in NCQ arrangements around an axis and translating, combined with
d. repositioning 2-tuples corresponding to four-point tuples in CQ arrangements based on the point position.

There are two embodiments of the equalizer: the redistribution and the repositioning equalizer. The redistribution equalizer is used to determine and produce a mechanism exhibiting a set of desired properties, whereas the repositioning equalizer employs the mechanism to carry out necessary steps during a use of the method.

A stacker then combines the results of the equalizer that correspond to the remapped regions to create a complete uniform distribution (within a tolerance) for all the affine invariants that the transformer produces.

The resulting system and method for producing a uniform distribution can be useful in storage and subsequent fast retrieval of objects from a database, load balancing the load induced on each of one or more processors that have the task of operating on a table of invariants representing parts of stored objects, qualitative assessment of the composition of the database etc.

6.0 BRIEF DESCRIPTION OF THE DRAWINGS

FIG. 1, comprising FIGS. 1A and 1B, is a drawing of prior art affine invariant mapping.

Figure 1B:
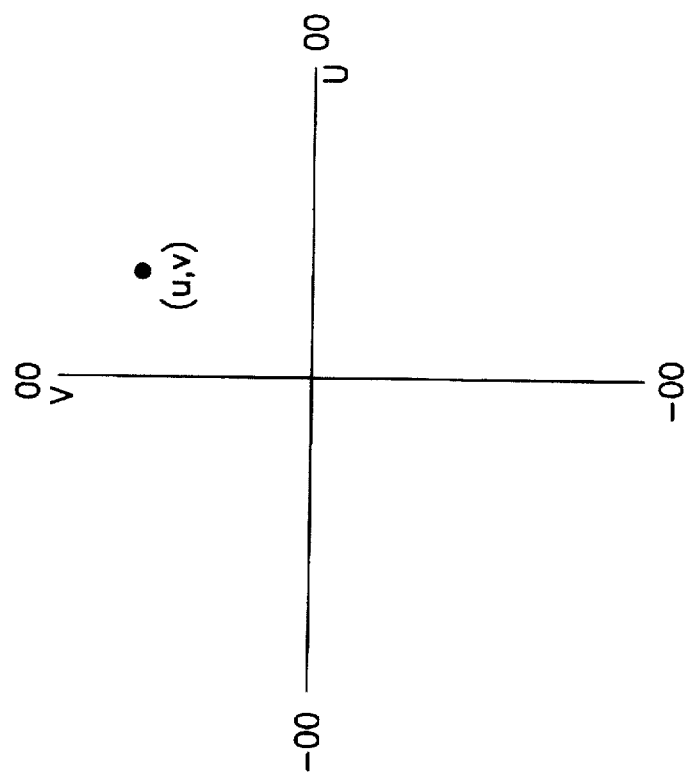
Figure 1A:
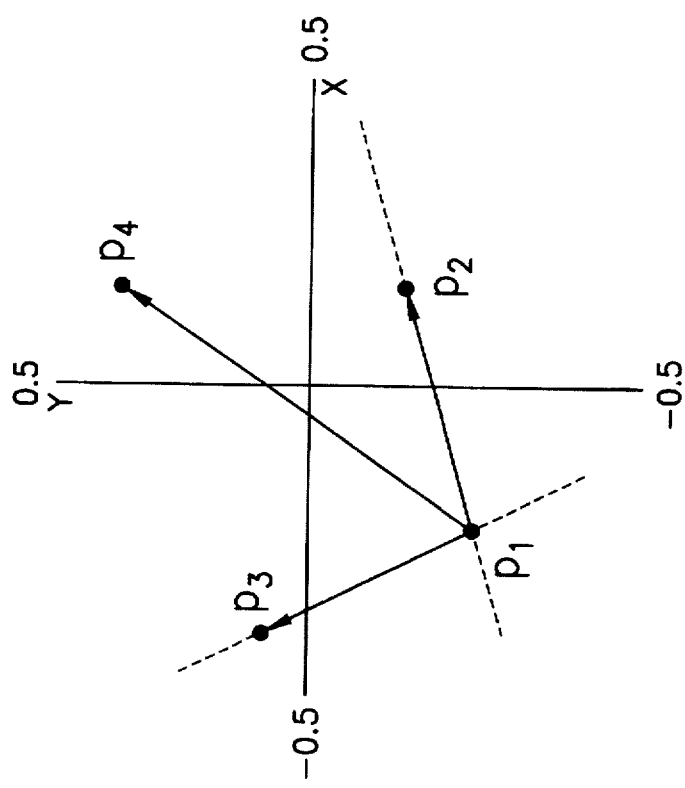

FIGS. 8A1 through 8A7 are the three-dimensional depictions of the meshes of the distribution of the invariant values u, v for a very large number of four-point tuples randomly and uniformly selected over a convex domain (e.g. a unit square) for each of seven classes of four-point tuples.

FIGS. 8B1 through 8B7 are depictions of the isocontours of the respective FIGS. 8A1 through 8A7.

Figure 9:
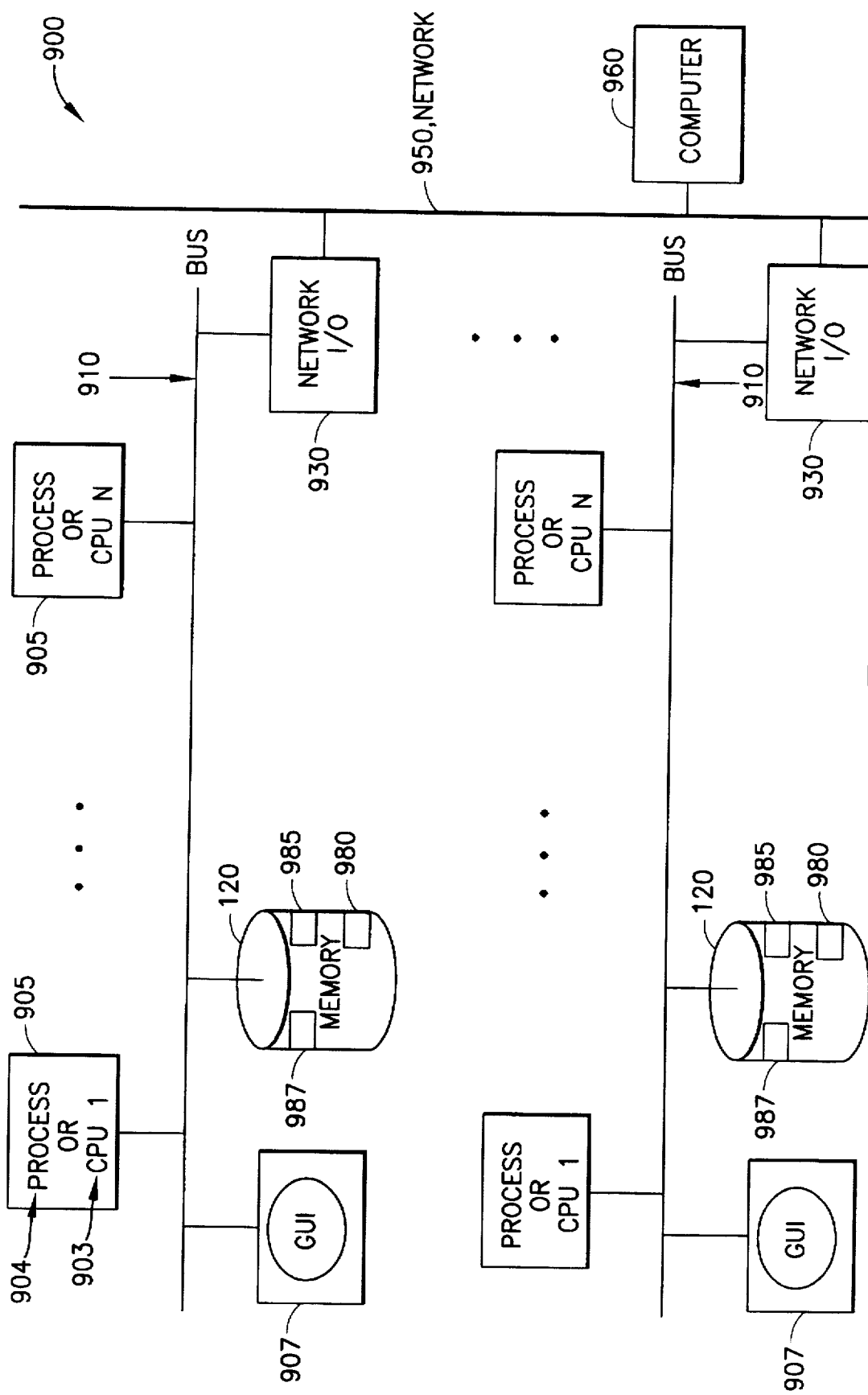

FIG. 9 is a block diagram of one preferred embodiment of a computer system that is used by the present invention.

Figure 10A:
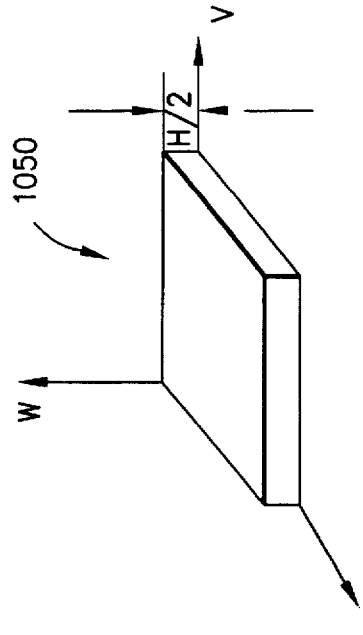

FIG. 10A is a schematic depiction of the probability density component corresponding to the distribution of any of the invariant values produced by four-points-tuples in any one of the only four possible NCQ arrangements from the seven planar regions.

Figure 10B:
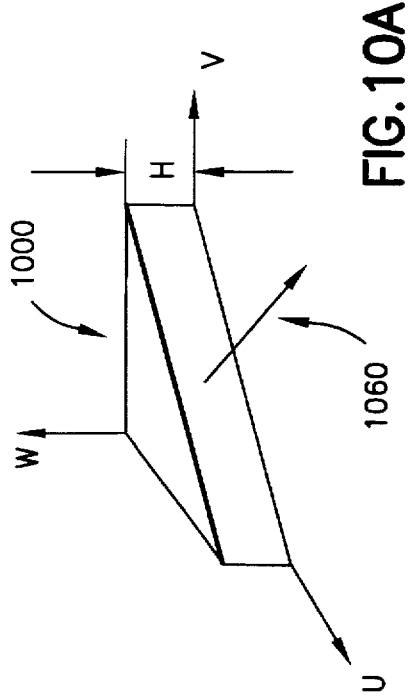

FIG. 10B is a schematic depiction of the probability density component after it has been uniformly distributed over the unit square, and obtained by appropriately "stretching" the distribution of FIG. 10A.

Figure 11A:
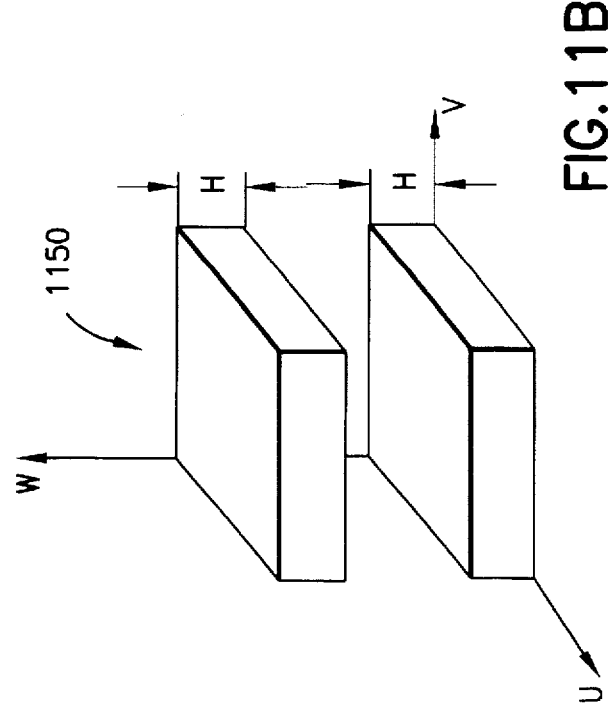

FIG. 11A is a schematic depiction of the probability density component corresponding to the distribution of any of the invariant values produced by four-points-tuples in each of the only four possible NCQ arrangements from the seven planar regions.

Figure 11B:
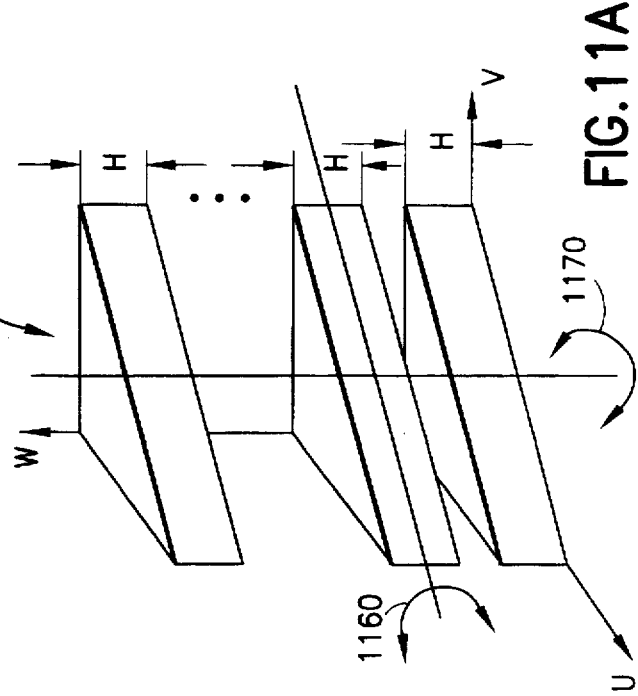

FIG. 11B is a schematic depiction of the probability density component corresponding to the distribution of the invariant values for any pair or all of the NCQ arrangements of FIG. 11A obtained by rotating or flipping one or more of the pair's members.

FIGS. 12A through 12C show a possible decomposition of the probability density component corresponding to the distribution of the invariants for any of the CQ distributions of FIG. 12A; the probability density component is decomposed into a parallelepiped (FIG. 12B), and a pyramid-like shape (FIG. 12C) that is to be subsequently flattened.

FIGS. 13A and 13B show the pyramid-like shape being flattened.

Figure 14B:
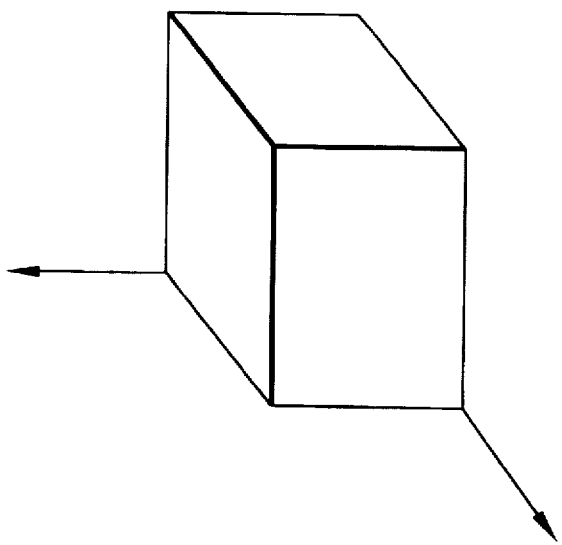
Figure 14A:
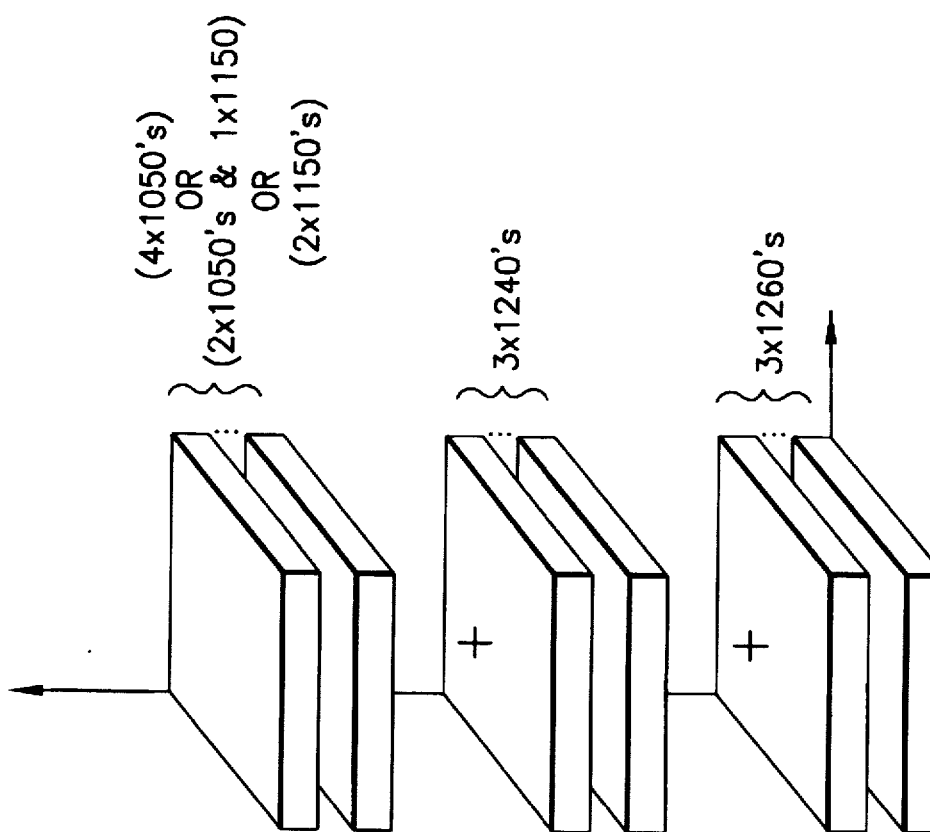

FIGS. 14A and 14B show the stacking of probability density components produced by four-point tuples in each of the seven possible planar arrangements after they have been re-transformed (stretched, rotated, flipped, or flattened) so that they are uniformly distributed over the unit square.

Figure 15A:
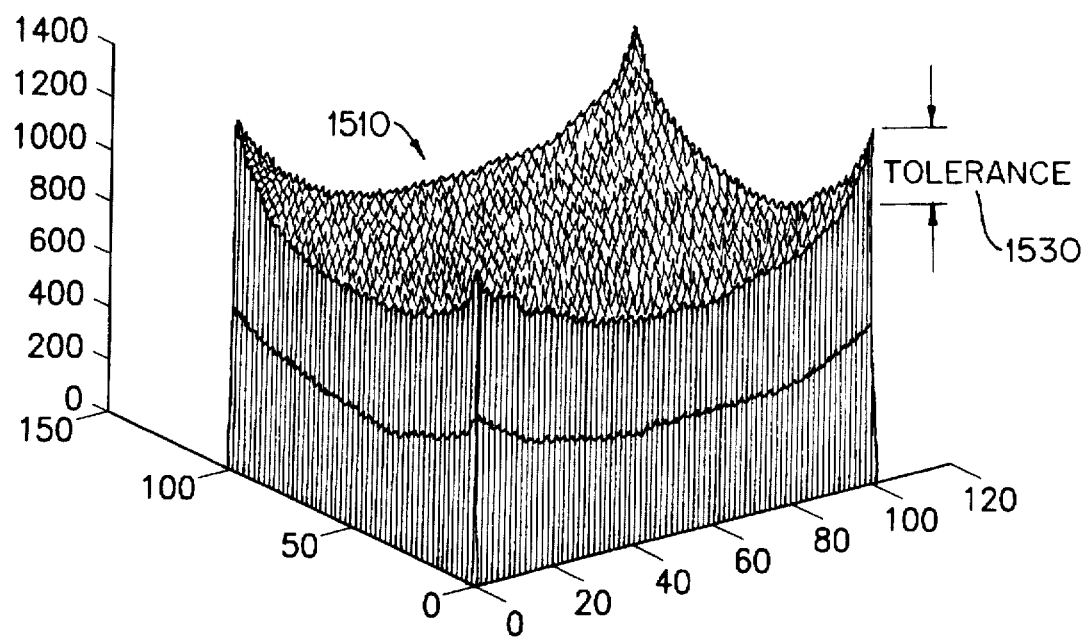

FIG. 15A is a mesh of the entire re-transformed and stacked contributions from the seven regions where the height at a given location indicates the degree of preference for a set of possible invariant values, the degree of preference being uniform over the entire range of invariant values, within a tolerance.

Figure 15B:
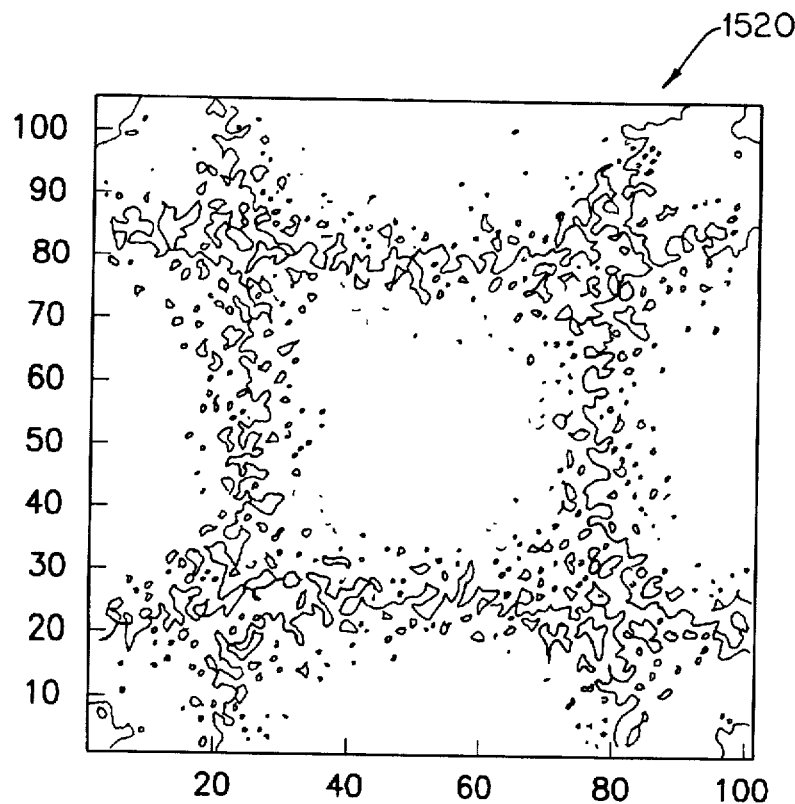

FIG. 15B shows the isocontours of FIG. 15A.

Figure 16A:
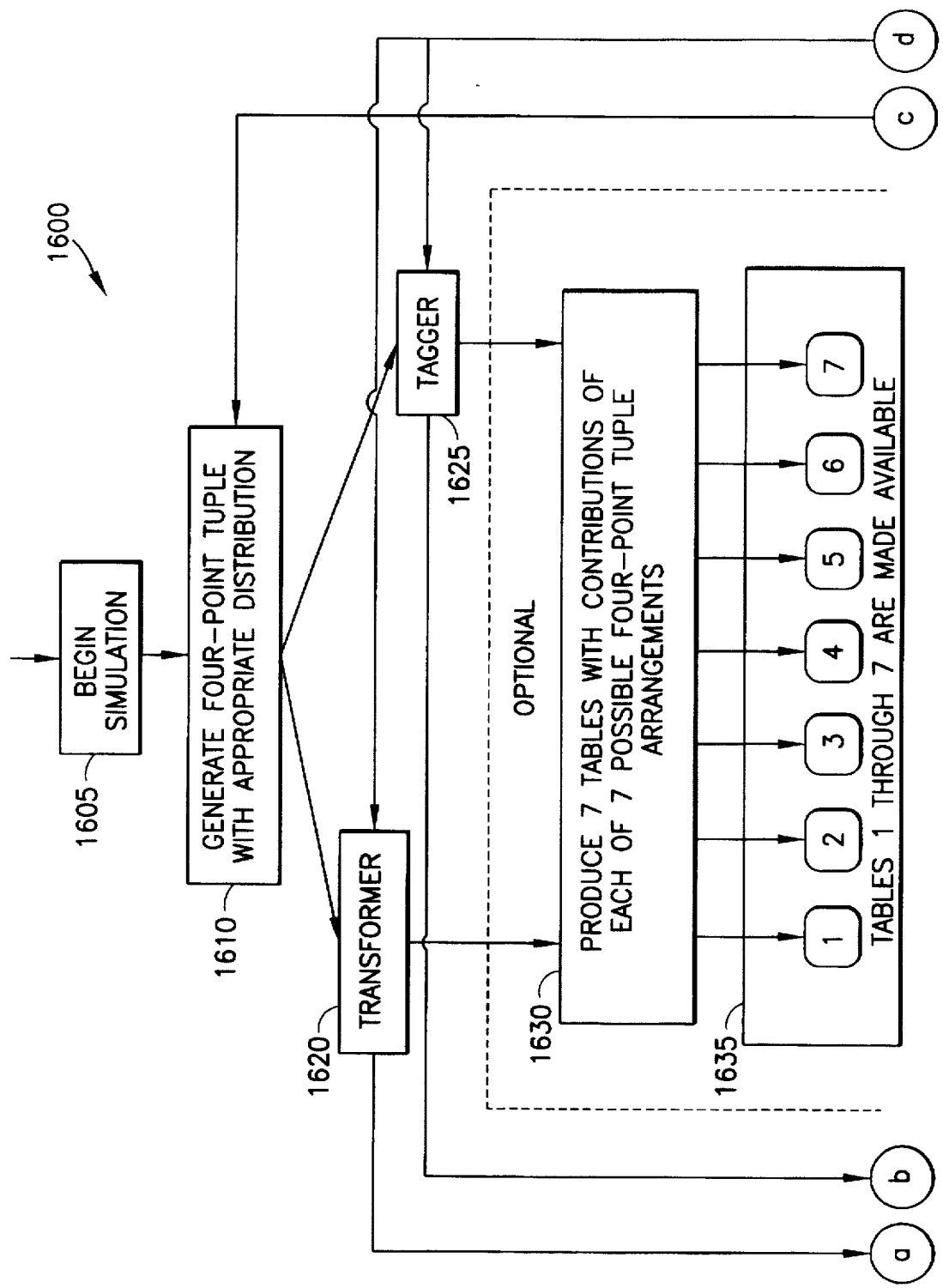
Figure 16B:
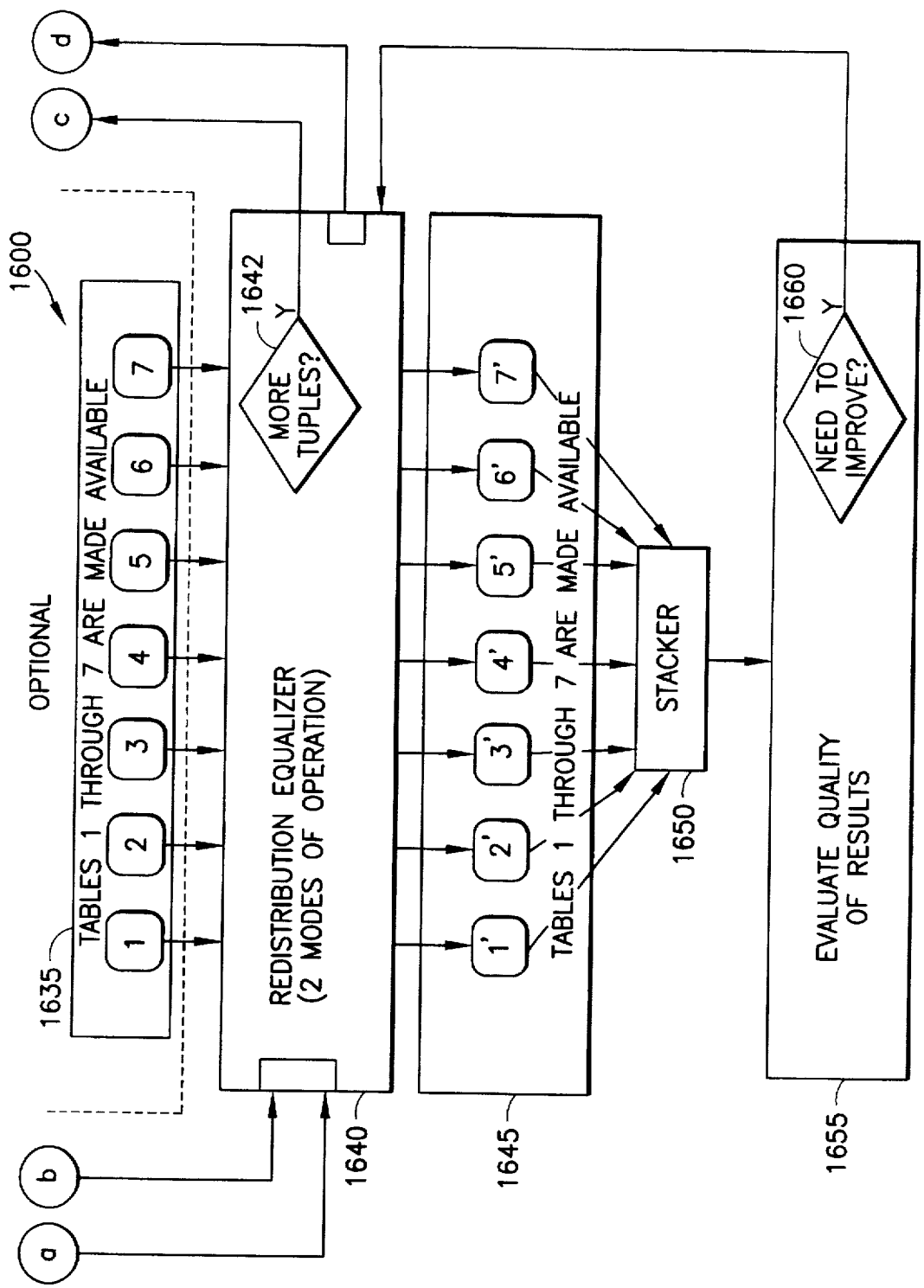

FIGS. 16A and 16B are a flowchart showing the steps performed to create the result shown in FIGS. 15A and 15B.

FIG. 17 is a flowchart showing the steps performed by a "stretch" process.

FIG. 18 is a flowchart showing the steps performed by a "flip" process.

Figure 19:
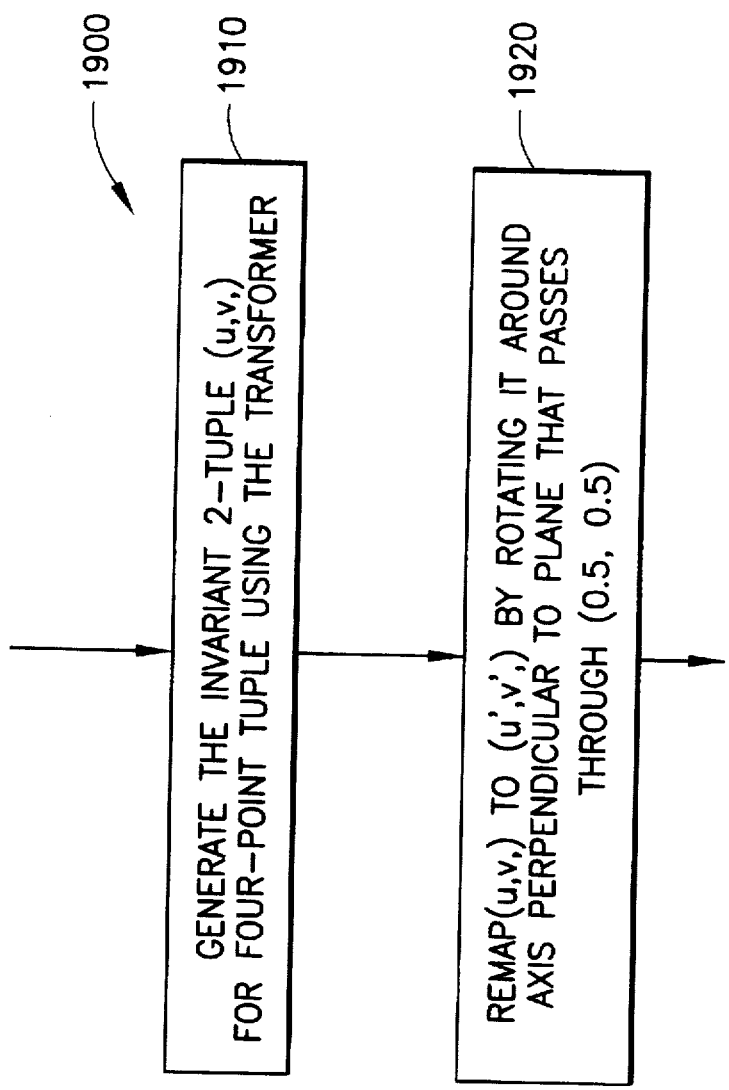

FIG. 19 is a flowchart showing the steps performed by a "rotate" process.

FIG. 20 is a flowchart showing the steps performed by a "approximate" process.

FIG. 21 is a flowchart showing the steps performed by a "flatten" process.

Figure 22A:
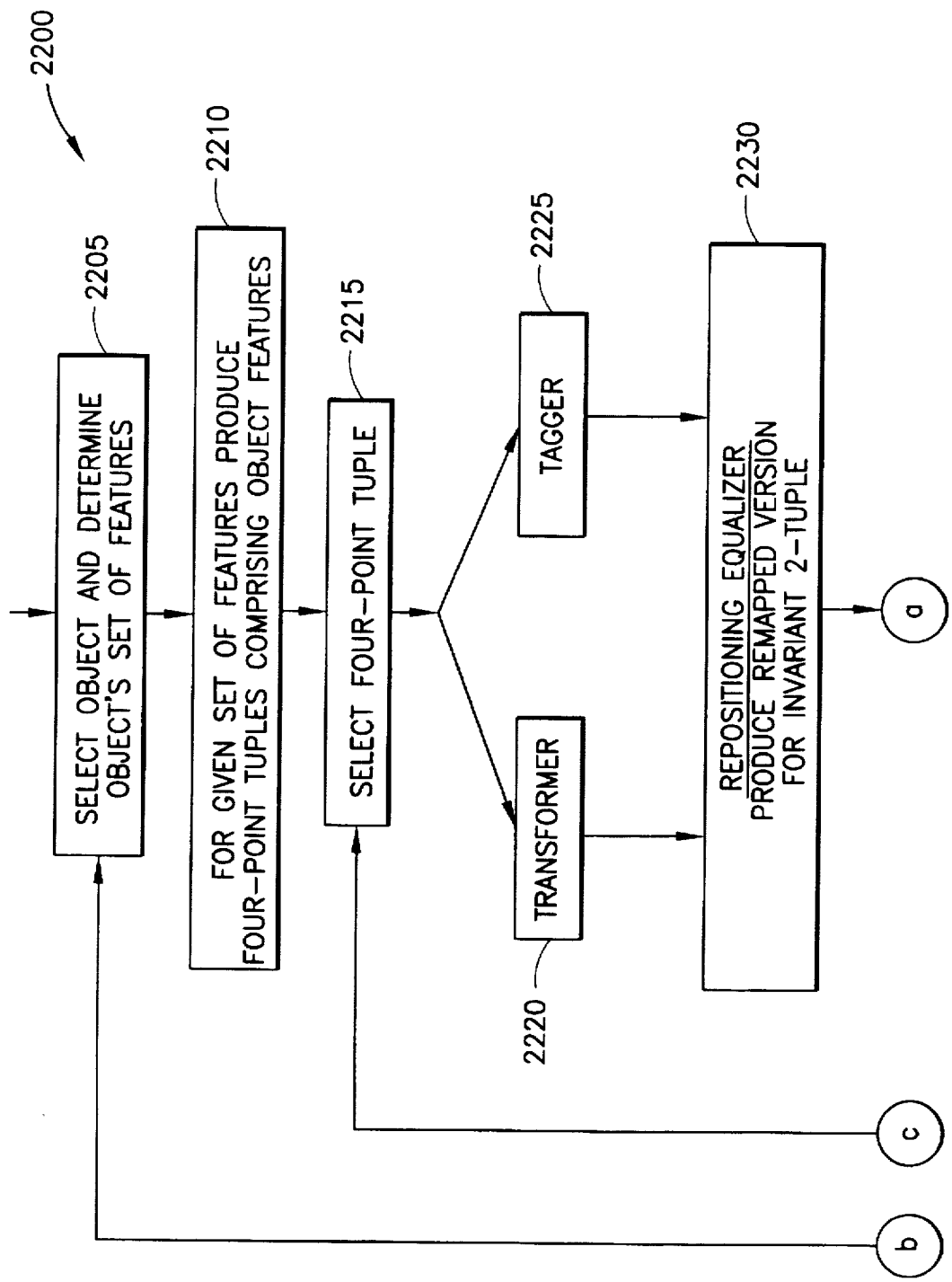

FIGS. 22A and 22B are a flowchart showing a method of use of the present invention on single or multiple processor computer systems.

Figure 23:
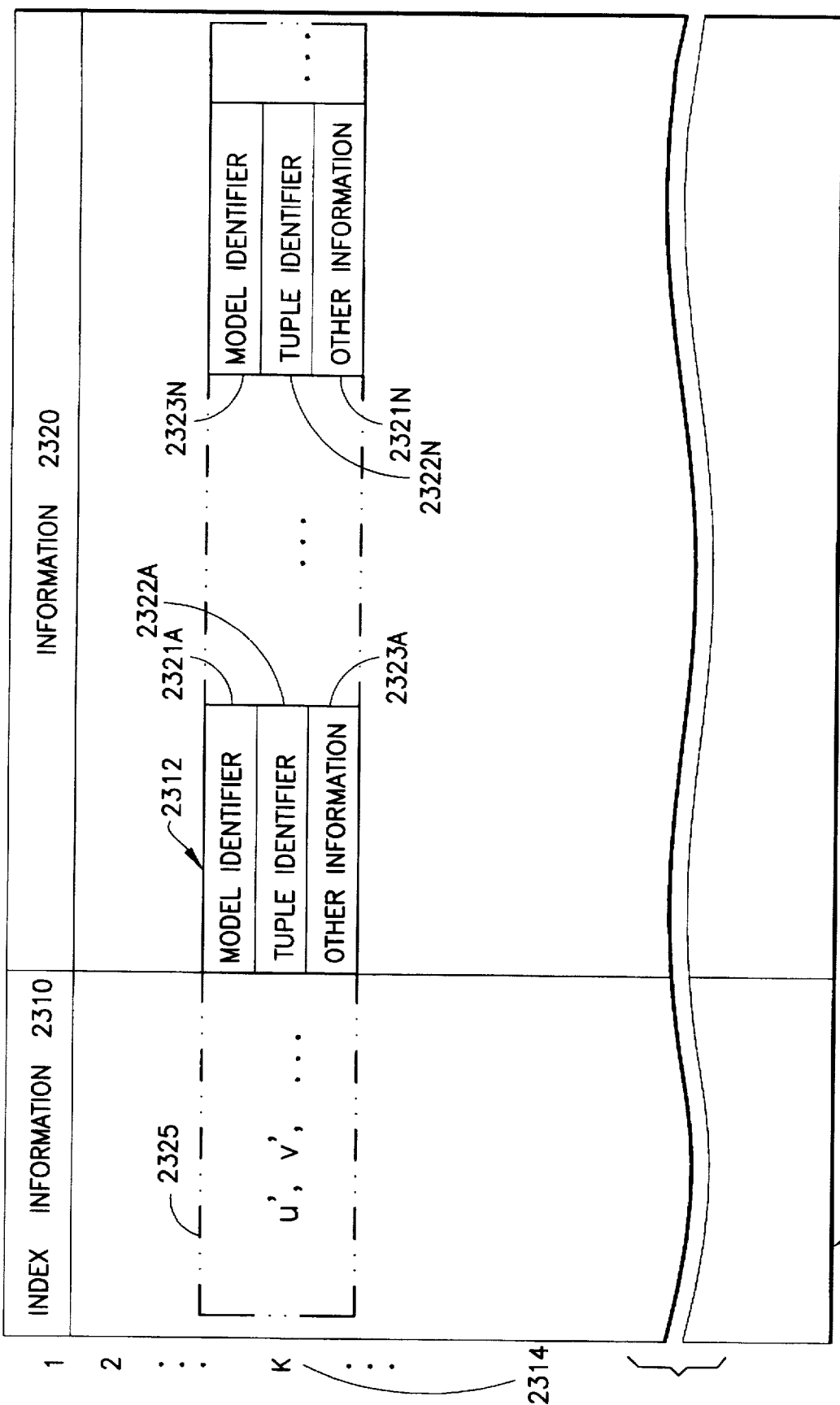

FIG. 23 is a depiction of a table indexed by the invariants generated by the present invention and used by the method in FIG. 22.

FIG. 24 is a depiction of a table, indexed by the invariants generated by the present invention and used by the method in FIG. 22, that shows the occupancy distribution across the table's bins before the application of the method described in this invention.

Figure 25:
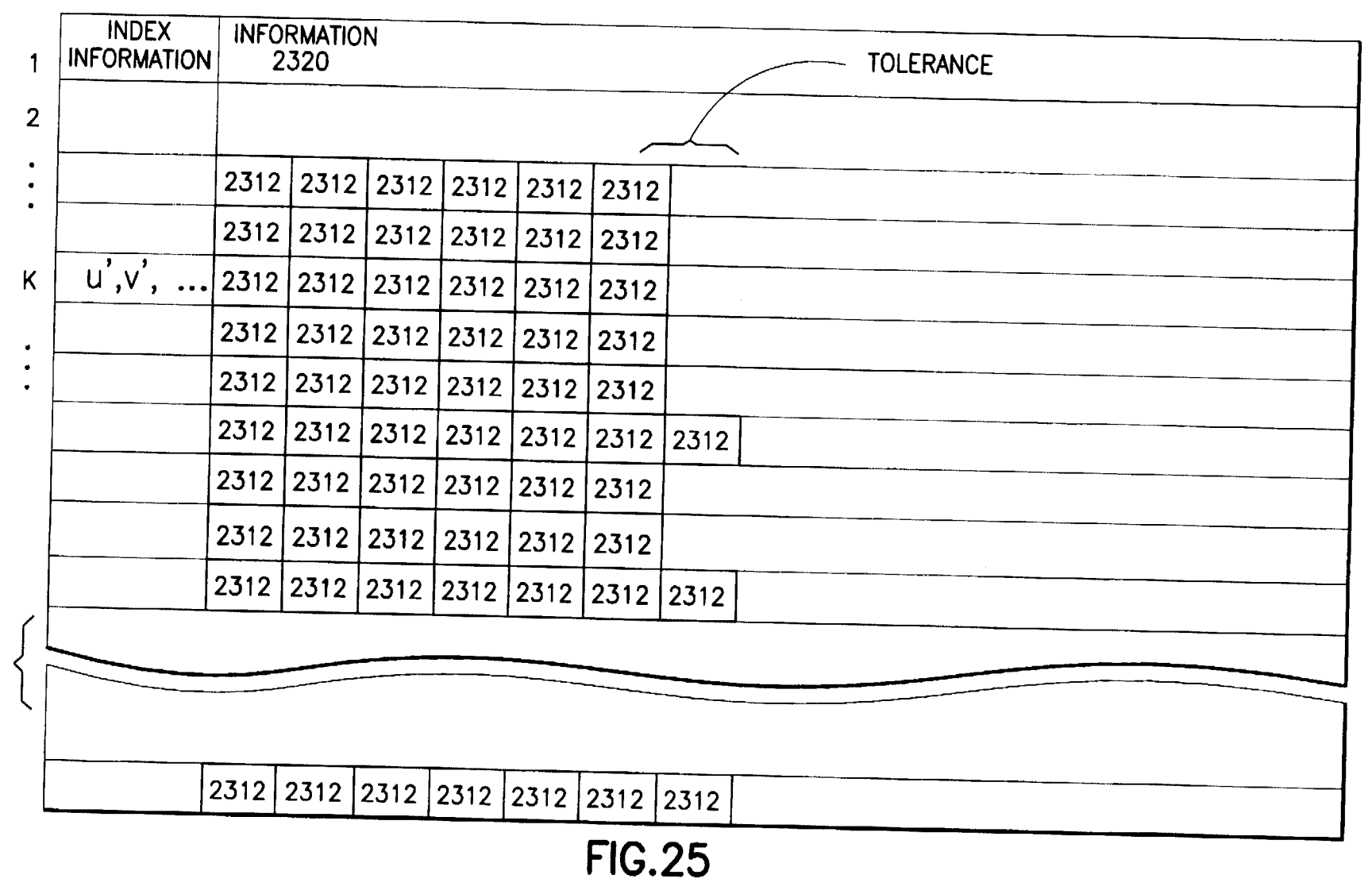

FIG. 25 is a depiction of a table, indexed by the invariants generated by the present invention and used by the method in FIG. 22, that shows the occupancy distribution across the table's bins after the application of the method described in this invention.

Figure 26:
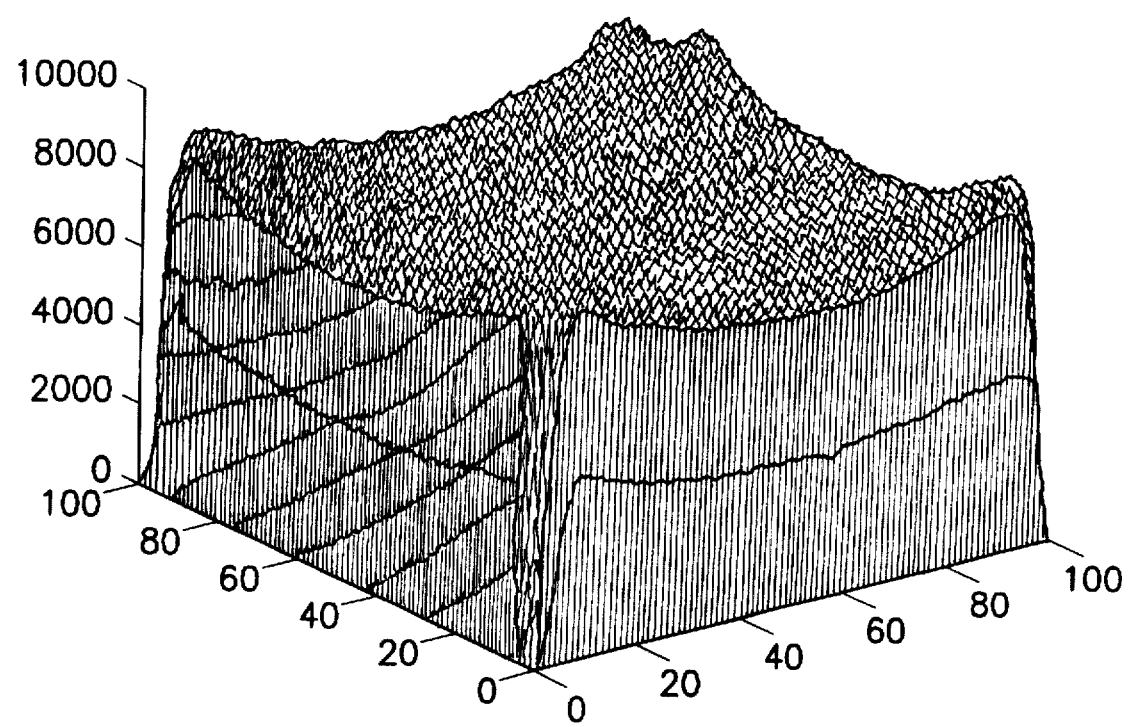

FIG. 26 is a mesh of the invariants produced by the system for a real-world database containing six hundred fingerprints from various individuals.

Figure 27:
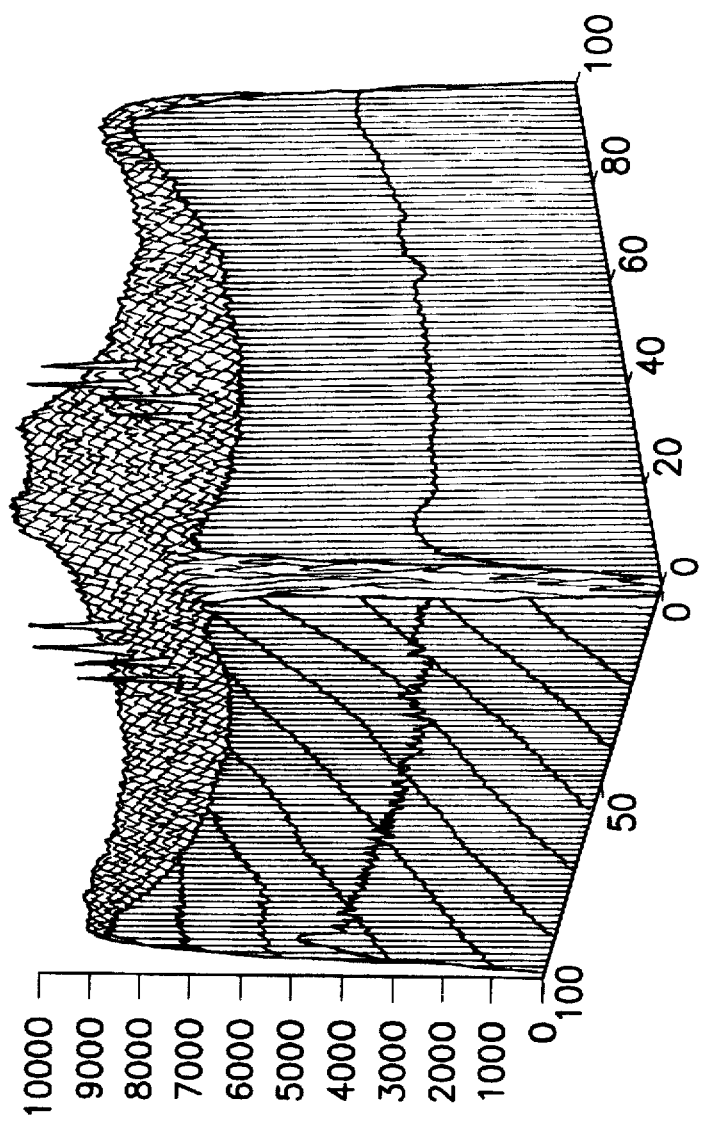

FIG. 27 is a mesh of the invariants produced by the system after the database used to produce FIG. 26 was augmented to also contain multiple occurrences of the same fragment from the contour of an F16 aircraft.

7.0 DETAILED DESCRIPTION OF THE INVENTION

Before proceeding, it is worth stressing that, as stated already, the objective of this discussion is to produce a method and a system that will allow the efficient handling of large databases of models. These models could represent actual physical objects such as airplanes, cars, fingerprints etc. Alternatively, they could be other physical parameters, for example measurements of two variables (e.g. pressure and temperature) and as such could be a collection of points in two-dimensional space. All such cases suffer from a recurrent problem, that of the non-uniform distribution of the indices over the space of invariants (and thus over the hash table). Any system that would need to carry out store and retrieve operations on large databases would need to address the problem of non-uniformity since the latter directly affects computational and search load sharing, disk storage usage, ability to discriminate among models, etc. The method and system proposed herein alleviate such problems by directly attacking the problem at its root: that of non-uniform distribution of the indices/invariants.

Although Ambartzumian did identify the existence of the seven distinct regions in which the first three points of the tuple divide the plane, he did not recognize or disclose the components to the probability density for the distribution of produced values in the space of invariants. Through a Monte-Carlo simulation, four-point tuples are drawn uniformly from a convex domain (a square) and invariants are produced using Ambartzumian's invariant producing equations. Counters are maintained for buckets corresponding to a tessellation of the space of invariants. Note that since the values of the produced invariants are in the interval [0,1]×[0,1] the table can "cover" all of this (finite-extent) region. At the end of the simulation, a discretized version of the probability density function is produced.

Figure 2A:
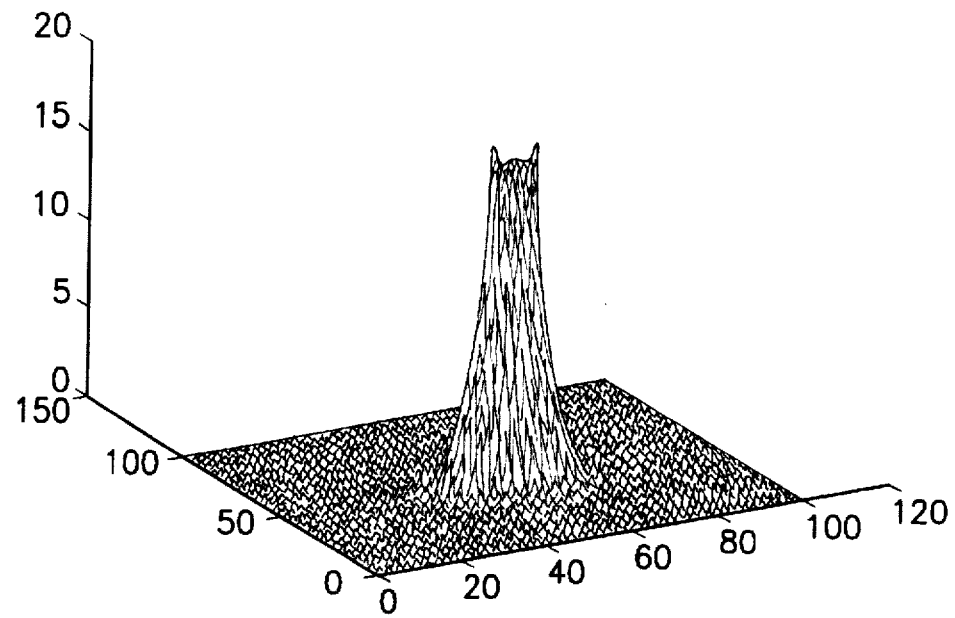
FIG. 2A is a prior art three-dimensional depiction of a mesh of the probability density function of the invariant mapping values u, v.
Figure 2B:
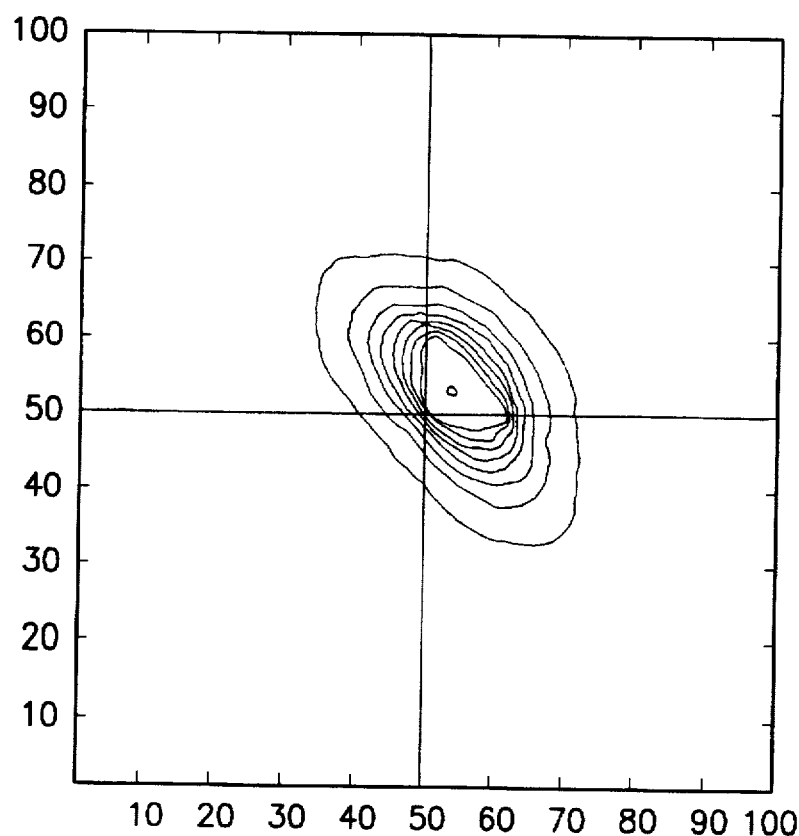
FIG. 2B is a prior art view showing isocontours of FIG. 2A.
Figure 3B:
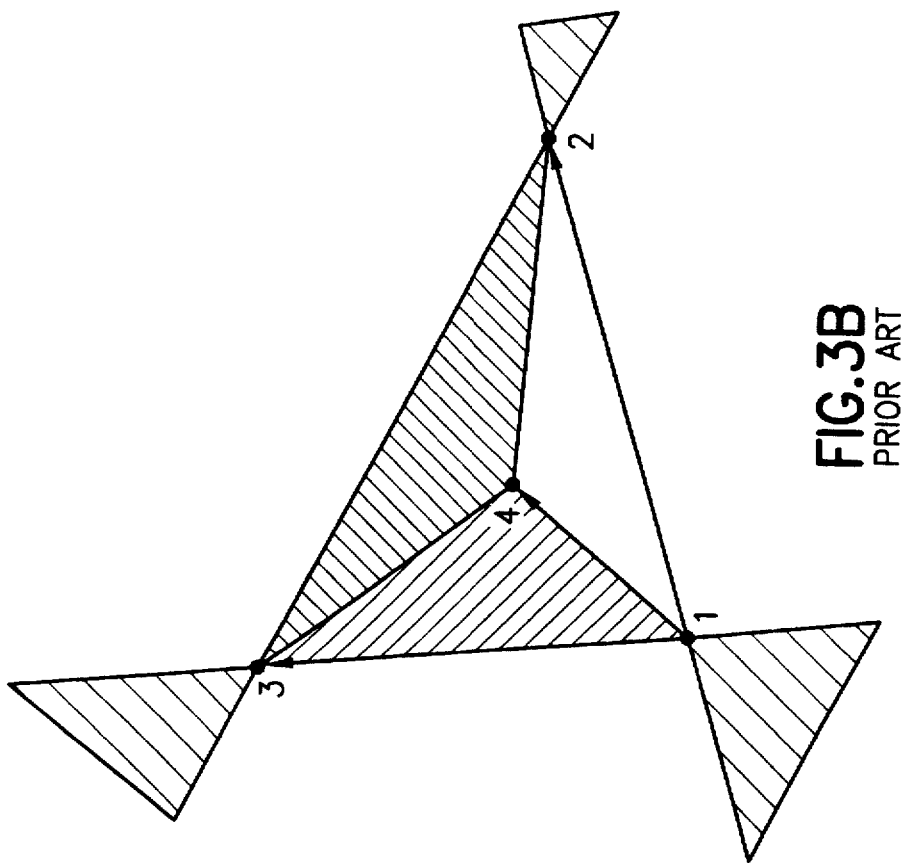
FIG. 3B is a prior art drawing outlining the various regions that are used in the computation of the Ambartzumian affine invariants, for four points forming a non-convex quadrilateral.
Figure 3A:
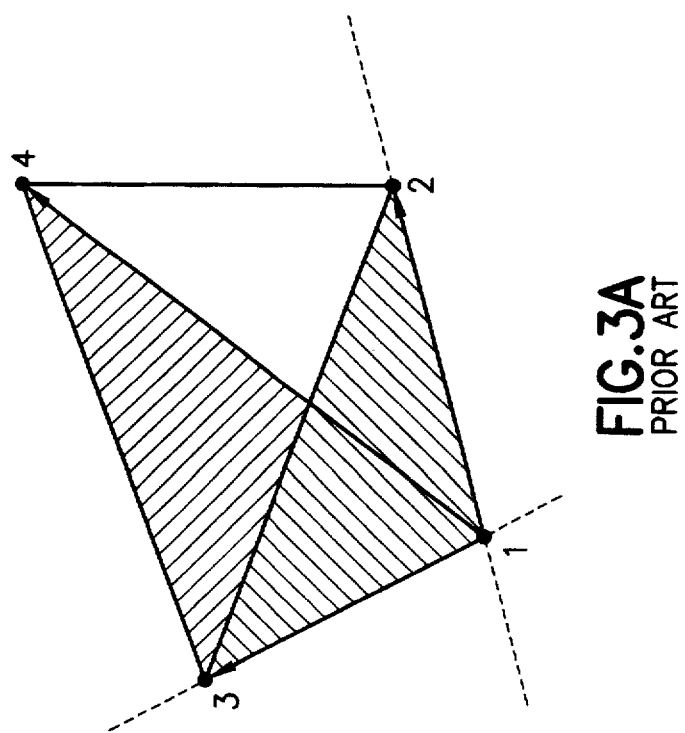
FIG. 3A is a prior art drawing outlining the various regions that are used in the computation of the Ambartzumian affine invariants, for four points forming a convex quadrilateral.
Figure 4B:
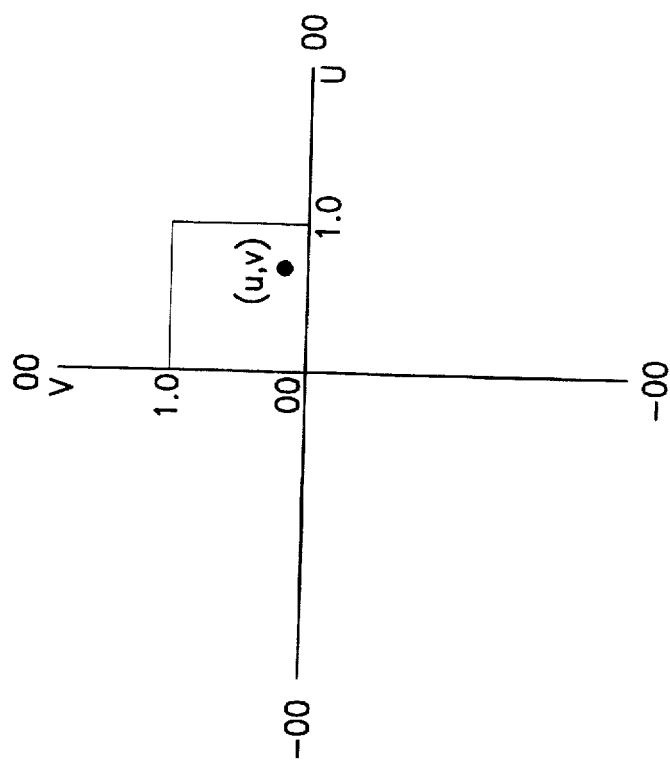
FIG. 4B is a prior art representation of the mapping of the invariant values u, v in the space of invariants.
Figure 4A:
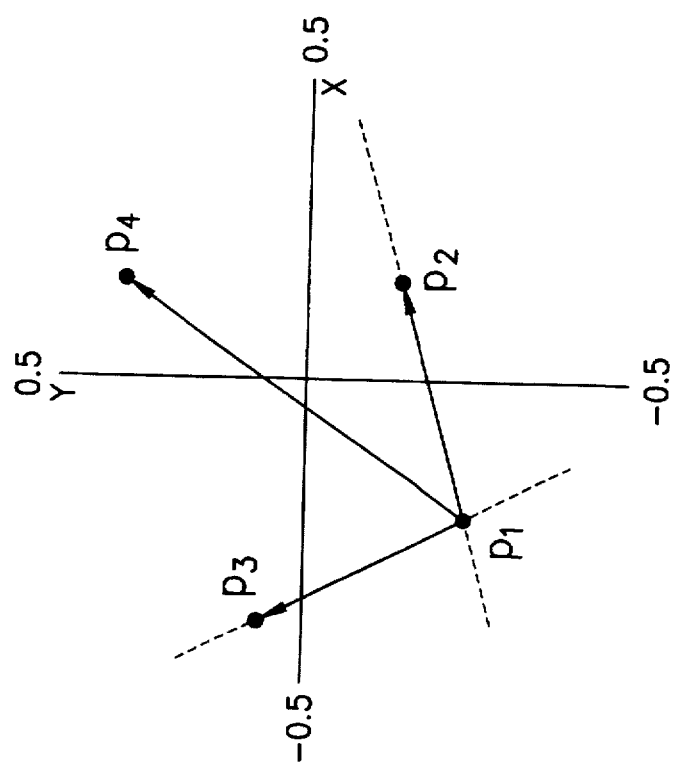
FIG. 4A is a prior art representation of a rectangular (unit square) convex domain with four points defining a skewed coordinate frame.
Figure 7A:
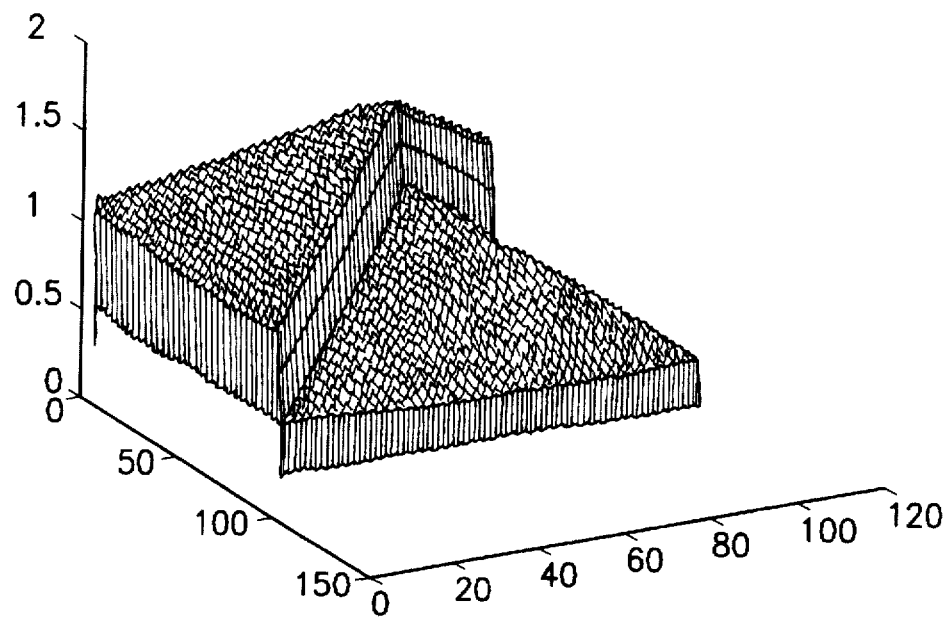
FIG. 7A is a three-dimensional depiction of a mesh of the distribution of the invariant values for a very large number of four-point tuples randomly and uniformly selected over a convex domain, e.g. a unit square.
Figure 7B:
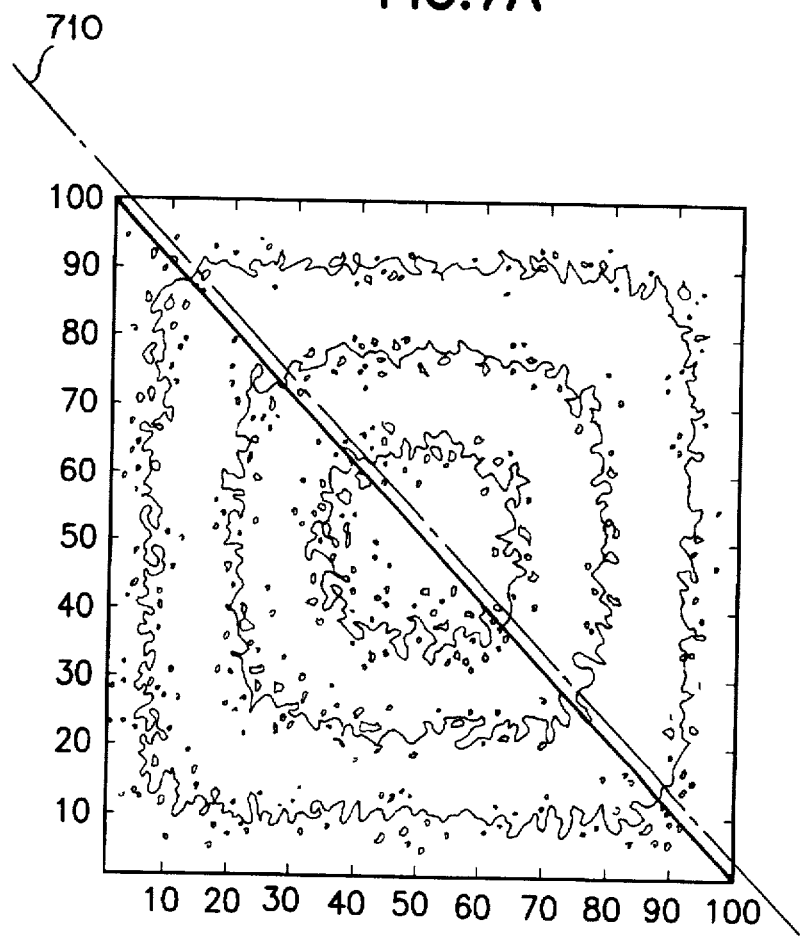
FIG. 7B is a depiction of the isocontours of FIG. 7A.

FIGS. 7A and 7B show a three-dimensional depiction of a mesh of the distribution of the invariant values for a very large number of four-point tuples randomly and uniformly selected over a convex domain, and the corresponding isocontours. Although the displayed results were obtained from four-point tuples that have been drawn uniformly from a square domain, all of the observations made here hold true for all convex domains one can have on the plane, namely triangle, high-order (5 and above) convex polygon, circle, ellipse, etc. Part of the discovery is that there is certain preference for some values of u and v over others. In particular, values of u and v that fall to the left and below the 135-degree line 710 are more preferable to values that fall to the right and above the line. This is demonstrated by the fact that the (discretized) probability density function assumes larger values in the region that is to the left and below of the 135-degree line, 710. Furthermore, values of u and v that are close to the point (0.5, 0.5) are more preferable to values further away. This statement is demonstrated by the following two observations: (a) for the region that is to the left and below the 135 degree line, 710, the probability density function assumes larger values closer to the (0.5, 0.5) point; and, (b) for the region that is to the right and above the 135 degree line, 710, the probability density function assumes larger values the closer one finds him/her-self to the (0.5, 0.5) point. As can be seen from both FIGS. 7A and 7B, the probability density function that corresponds to the produced values of u and v exhibits a discontinuity along the 135-degree line, 710. At first, the situation does not seem to be any better than the situation depicted in FIGS. 2A and 2B (geometric hashing case).

However, there is a novel and powerful way to tackle the problem at hand. This is another discovery that has not been disclosed or suggested by the prior art. In particular, the discovery is that independent of the shape of the convex domain K, one can concentrate on the exactly 7 individual component/contributions to the probability density function from four-point tuples where the fourth point falls in a given-number region. In what follows, the terms component and contribution will be used interchangeably.

To exploit this, the contributions to the probability density function of the invariants from each four-point tuple are tagged, separated, and tracked according to which of the seven regions of the plane (the regions being determined by the first three points of the tuple) the fourth point lies in. All of the four-point tuples with their fourth point in region i, where i=1,2, . . . 7, belong to the i-th class of tuples and produce the i-th contribution to the final probability density function for u and v. During the Monte-Carlo simulation, seven tables (or seven parts of one table) instead of one are maintained, one for each of the seven classes of contributing four-point tuples. Each one of the seven tables "covers" all of the finite extent region under consideration (this is the square [0,1]×[0,1]) and counters are maintained that correspond to a tessellation of this region of the space of invariants. In this modified version of the Monte-Carlo simulation and for a given table, a counter associated with a bucket of the table keeps track of the contribution to the probability density function from the region corresponding to the bucket's extent as this pertains to the class of four-point tuples that the table keeps track of. Upon termination of the Monte-Carlo simulation, the probability density function can be produced as the cumulative result of the contributions from these seven tables. To produce this cumulative result, the seven tables must be superimposed: for a given bucket, the values of the respective seven counters from each of the seven tables are added up; the resulting values provide a discretized version of the probability density function.

FIGS. 8A1 through 8A7 are the three-dimensional depictions of the meshes of the distribution of the invariant values u, v for a very large number of four-point tuples randomly and uniformly selected over a convex domain (here, it is a unit square), for each of the seven classes for which four-point tuples are tagged. FIGS. 8B1 through 8B7 are depictions of the isocontours of the respective FIGS. 8A1 through 8A7. A number of very interesting observations can be made based on these simulation results. In particular, a. the distributions of invariants for all NCQ arrangements are identical, b. the distribution of invariants for all CQ arrangements are identical, c. the distributions of invariants for all the NCQ arrangements is uniform (within a tolerance) over a closed (triangular shaped) domain in invariant space for four-point tuples uniformly drawn from any convex feature domain, and d. the distributions of invariants for all the CQ arrangements exhibits a point and line symmetry for four-point tuples uniformly drawn from any convex feature domain and can be approximated.

FIG. 9 is a block diagram of one preferred embodiment of a computer system 900 that is used by the present invention. The system 900 has one or more computers and/or processes. An example of a computer 905 is a central processing unit (CPU) 903 like an IBM RS 6000 connected to a bus 910 that is further connected to one or more memories 120, a graphical user interface (GUI) 907, and optionally a network input/output (I/O) device 930. One or more processors 905 can be connected to the bus 910, as in an IBM SPI 970. Alternatively, one or more of the CPUs 903 could be executing one or more programs (or processes) 904 that the CPUs 903 execute. The network I/O 930 is connected to a network 950 that is capable of connecting to one or more other computers 960 that would also have a network I/O 930, a CPU 903 one or more memories 120, and a GUI 907. Computers (905,960) like this, and particularly parallel systems (900), are well known in the computer arts. One or more of the computers in the system 900 will store the data structures 980 and execute the processes 985 that are described below.

FIG. 10A is a schematic depiction of the contribution to the probability density function from the invariant values produced by four-points-tuples in any one of the only four possible NCQ arrangements from the seven planar regions. As has already been described above, when the four-point tuples are in any one of the four possible NCQ arrangements, the values generated by the invariant-producing function will satisfy the first set of inequalities stated in the description of the FIG. 5. Note that this set of inequalities will hold true independent of the shape of the convex domain the four point of the four-point tuple are drawn from! The only thing that is going to be different in each case is the height H of the component distribution. Indeed, it can be shown easily that the value of H must satisfy the following equation:

$$\tfrac{1}{2} H = Pr \text{ (four-point tuple forms non-convex quadrilateral)}/4 \qquad 5$$

The explanation has as follows: any four-point tuple that is drawn uniformly from the convex domain under consideration can belong to one of four classes, based on which of regions 1, 3, 5, or 7 the fourth point lies in (see also discussion above). By symmetry arguments, the invariant values generated by four-point tuples belonging to the i-th class (i=1, 3, 5, or 7) will contribute to the probability density function exactly ¼ of the total contribution that arises from four-point tuples in NCQ arrangements; but, this latter total contribution is equal to the probability that a four-point tuple drawn randomly and uniformly from the convex domain under consideration forms a non-convex quadrilateral. Each component contribution is in turn equal to the volume of the contributing block 1000, i.e. ½ H. Finally, notice that the value of Pr(four-point tuple forms non-convex quadrilateral) is given by the answer to Sylvester's Vierpunkt problem, a well-known problem from geometric probability, and depends on the shape of the convex domain that the four-point tuple is drawn from. Given that the value of H depends on the shape of the domain, it is clear that all of the following discussion is applicable to any shape convex domain.

FIG. 10B is a schematic depiction of the contributing component of FIG. 10A after it has been uniformly distributed over the unit square, and is obtained by appropriately "stretching" the distribution of FIG. 10A. Since the redistribution in essence will spread the volume depicted in FIG. 10A over an area that is twice as big as the previous one, the resulting expected new height is going to be ½ H. This stretching operation is in essence a remapping of the invariant values in a manner that is dependent on the original position of the invariant (u,v). The actual steps involved in this stretching process are described below.

Figure 5:
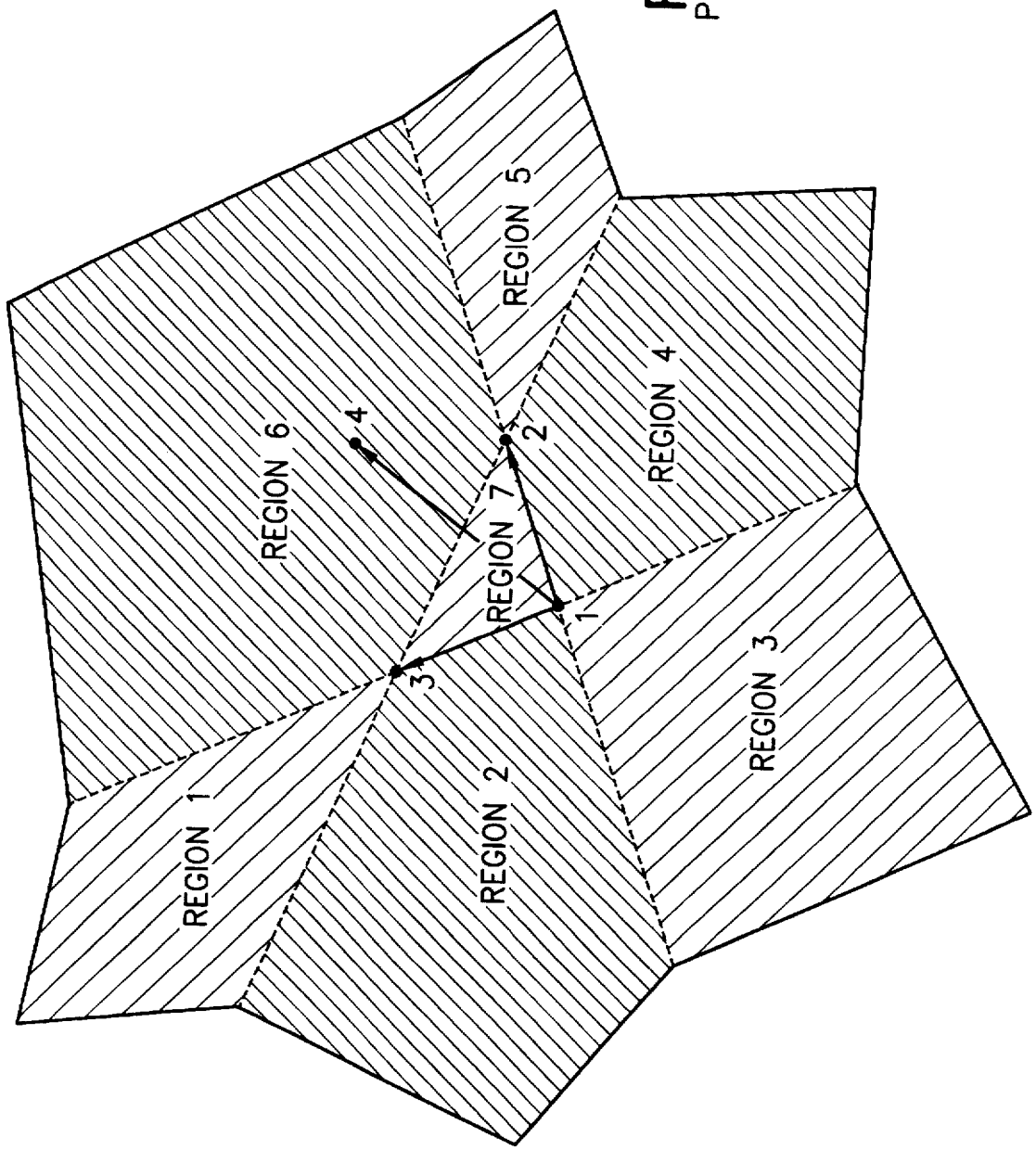
FIG. 5 is a prior art representation of exactly seven regions in which any three non-collinear planar points divide the plane.
Figure 6:
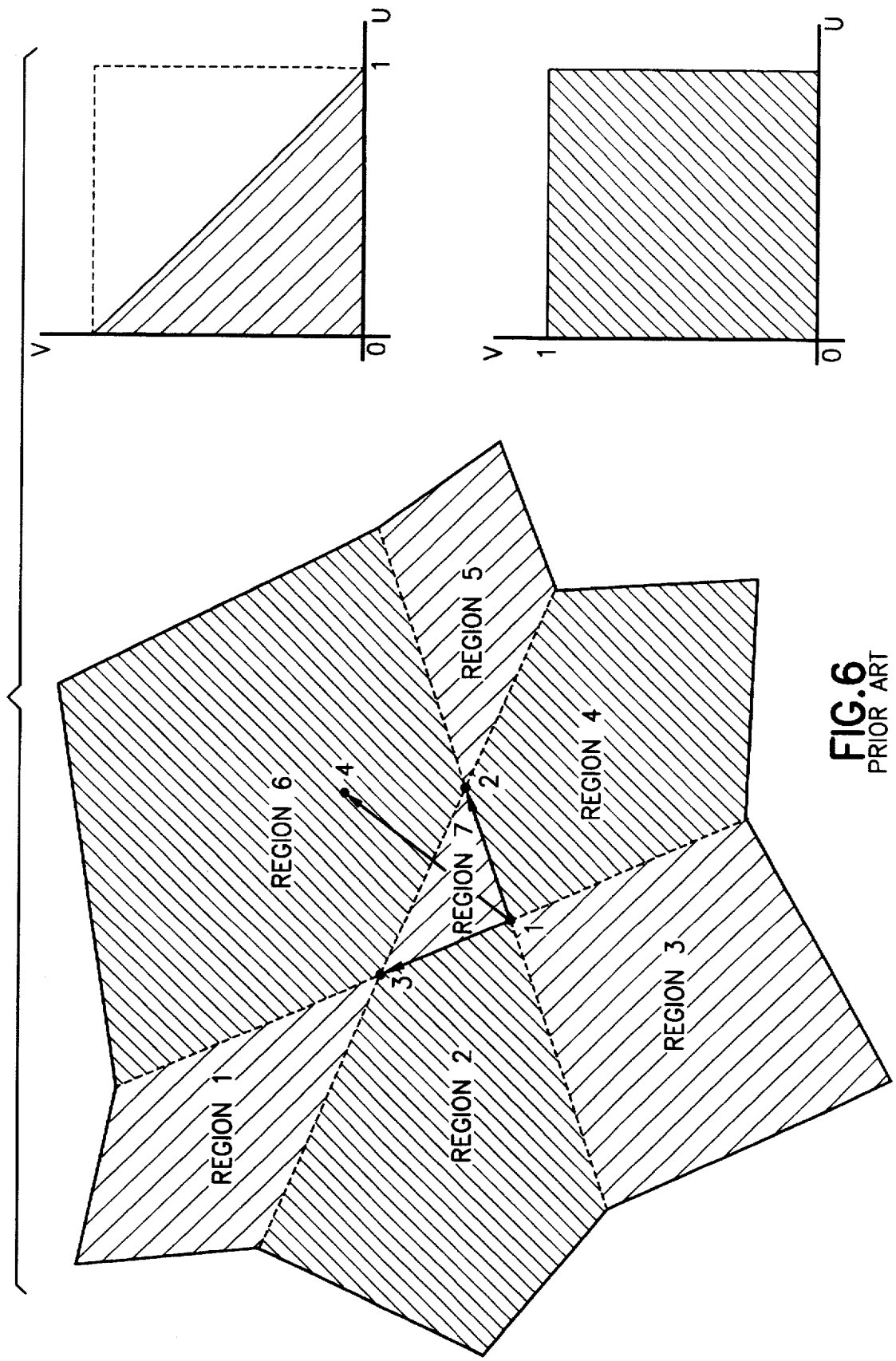
FIG. 6 is a prior art representation of where, in the space of invariants, the invariants produced by a randomly selected fourth point map for each of the seven possible regions of FIG. 5.

FIG. 11A is a schematic depiction of the four contributions 1100 to the probability density function from the invariant values produced by four-point tuples in each of the only four possible classes corresponding to regions 1, 3, 5, and 7 (as per our numbering scheme shown in FIG. 5). Recall that these four sets of invariant values will provide equal contributions to the probability density function. If a four-point tuple generates a 2-tuple of invariants (u, v) we can apply a remapping to the point (u, v) to a new location (u', v') so that the four-point tuple can be thought of as generating (u', v') instead. This new point (u', v') can be produced by rotating 1160 point (u, v) around an axis that coincides with the line u+v=1—("flipping"). Alternatively, the new point (u', v') can be produced by rotating 1170 point (u, v) around an axis that is perpendicular to the u-v plane and passes from (0.5, 0.5)—("rotating"). Concentrating on the values that are produced by four-point tuples of one of the four classes i, i=1, 3, 5 or 7, the net effect of either of the two remappings is going to be a distribution of the respective invariant values over a triangle-shaped region in the space of invariants that is delimited by the points (1,0), (1,1) and (0,1). Applying the remapping to exactly two (in fact any two) of the four contributing components 1100, precisely two contributions will extend over the triangle delimited by the three points (0,0), (1,0) and (0,1) of the space of invariants whereas the remaining two contributions extend over the triangle delimited by the points (1,0), (1,1) and (0,1). Pairing up one contribution from one of the two groups to one contribution from the other group, we can form one contribution 1150 of height H that extends over the square delimited by the points (0,0), (1,0), (1,1) and (0,1) of the space of invariants; and, there can be exactly two such contributions. This is precisely what is depicted in FIG. 11B which shows schematically the contribution 1150 to the probability density function from the invariant values for each of the two squares that are formed by rotating or flipping one or more of the corresponding pair's members (1100).

FIG. 12A is a schematic depiction of the contribution to the probability density function from the invariant values produced by four-point tuples in any of the three possible classes corresponding to regions 2, 4, and 6 (as per our numbering scheme shown in FIG. 5). Recall that each of the three sets of invariant values will provide identical contributions to the probability density function. As was shown in FIGS. 8A2/8B2, 8A4/8B4, 8A6/8B6 these four contributions have a rather peculiar shape which roughly resembles the union of a parallelepiped and a pyramid. It should be stressed here that despite the fact that graphically one of the objects is shown to be a pyramid (FIG. 12A), it is not. As a matter of fact, the pyramid-like component of the shape is more complex and this will be described below. However, for the purposes of the simplicity of drawing and description the shape will be referred to as a pyramid-like. This decomposition of the shape into a parallelepiped 1240 (FIG. 12B) and a pyramid-like shape 1250 (FIG. 12C) is purely conceptual and facilitates the flattening of the shape via redistribution (remapping) of the invariant values. Alternatively, each of these three contributions may be seen as having a DC-component (parallelepiped 1240) to which a pyramid-like one (1250) is added. It is important to note that the contribution to the total probability density function from the invariants produced by four-point tuples in CQ arrangements that belong to a given class (2, 4, or 6) is going to have a shape similar to the schematic depiction of FIG. 12A, independent of the shape of the convex domain K from where the four-point tuples are drawn; the only difference will be in the actual value of the DC component (=height of the parallelepiped 1240) and the specifics (e.g. height, degree of roundness, etc.) of the pyramid-like shape 1250. Moreover, it is easy to see that the sum of the three volumes 1200 such as the one depicted in FIG. 12A (with each of the volumes corresponding to classes 2, 4, and 6 respectively), will be a number less than one and equal to the value of the probability that a four-point tuple drawn randomly and uniformly from a convex domain K forms a convex quadrilateral. The value of this probability is again connected to the answer to Sylvester's Vierpunkt problem, and depends on the shape of the domain K.

FIG. 13 shows the pyramid-like shape being flattened. Since the redistribution in essence will spread the volume within the shape depicted in FIG. 13A over the volume of a parallelepiped (FIG. 13B) with the same area signature (i.e. a square), the resulting expected height of the parallelepiped is going to be much smaller. This "flattening" operation is in essence a remapping of the invariant values produced by four-point tuples in classes 2, 4, or 6 to new points (u',v'), in a manner that is dependent on the original position of the invariant (u,v).

The ideal situation is when a closed-form expression can be derived for the shape of FIG. 12A by means of the expression of the invariant-producing function and the knowledge of the distribution of the points forming a four-point tuple. In this particular situation, there is a total of 8 independent random variables, 2 variables for each of the 4 points: the 2 variables are the x and y coordinates of a point. Knowledge of the distribution of points $p_i = \{x_i, y_i\}$, i=1,2,3,4 over the convex domain K would allow the derivation of the joint probability density function f(u,v) for the random variables u and v. Knowledge of the invariant producing function in turn allows the derivation of the Jacobian J of the transformation that maps the four points of the feature domain to the single point of the space of invariants. The culmination of these steps is the derivation of the joint probability density function f(u,v) for the affine invariants u and v through computation of the integral $$\int_{R_6} f(x_4(u,v),y_4(u,v)) f(x_1,y_1) f(x_2,y_2) f(x_3,y_3) |J|^{-1} dx_1 dx_2 dx_3 dy_1 dy_2 dy_3 \qquad 6$$

In this formula, |.| denotes the absolute value of its argument. The theory supporting all of this analysis can be found in any of the standard probability literature.

Unfortunately, evaluation of this last integral is notoriously difficult, especially as the number of involved independent variables increases. Not surprisingly, derivation of the joint probability density function f(u,v) for our problem using this expression has proven intractable.

But although derivation from first principles of the expression for the probability density function f(u,v) has not been possible, an alternative route has been exploited. The idea here is to guess the functional form of f(u,v), express it in a parametric manner and attempt to compute the best values of the parameters leading to a best fit to the available data. In essence, this approach bypasses the evaluation of the integral and attempts to directly estimate its value, which in this case is a functional expression in terms of the variables u and v. Given the approximate expression for f(u,v) a remapping function $h=(h_1(u,v),h_2(u,v))$ is produced that remaps each point (u,v) to (u',v'). The net effect of applying the remapping on the values produced by the invariant-producing function is the flattened distribution 1260 (FIG. 13B). The "approximate" and "flatten" steps are discussed in more detail below.

Let us pause for a moment and examine what has been achieved by the operations depicted in FIGS. 10, 11, 12, and 13. In each of these cases, the contribution to the total probability density function from invariant values was produced by four-point tuples that belonged to one of the seven classes, 1 through 7. The contributions generated by a given class of four-point tuples corresponded to invariant values that extended over a region of the space of invariants. For simplicity, the region corresponding to class i will be referred to as the "range of class i." In all cases, and independent of the shape of the convex domain K from where the four point tuples were drawn, the ranges of a given class exhibited one of the following two properties:

a. if the class showed no preference for certain invariant values in its range over others, then the range of the class did not coincide with the square [0,1]×[0,1]; and, b. if the region for the class coincided with the square [0,1]×[0,1] then the class showed preference for certain invariant values in its range over others.

If the contribution from a given class exhibited property (a) above, then the invariant values were operated upon with a remapping operation in a manner that guaranteed that the new range of the class following the remapping coincided with the square [0,1]×[0,1] while the lack of preference for certain values (of the class' new range) over others was preserved. Classes 1, 3, 5, and 7 were in this category and the necessary remapping was in the form of flipping, rotating, stretching, or of appropriate combinations of these. FIGS. 10 and 11 depict these operations.

On the other hand, if the contribution from a given class exhibited property (b) above, then the invariant values were operated upon with a remapping operation that maintained the range of the class identical to the square [0,1]×[0,1] but achieved lack of preference (within a tolerance) for certain values over others across the range of the class. Classes 2, 4, and 6 fell in this category and the necessary remapping was the flattening. FIGS. 12 and 13 depicted the flattening operation.

In both of these cases, the output of the tagger stage 1625 (FIG. 16A) is used to identify the class of a given four-point tuple as one of seven possible values, 1 through 7; it is based on this output that the appropriate operation is selected.

All of these remapping operations are equivalent to applying a new function g( ) to values produced by the original invariant producing function h( ) described by Eqn. 2. The new function g has as many branches as the number of classes and the result of its application is a new invariant-generating function h* equal to the synthesis of g and h. i.e. h*=g(h( )). The function g operates on the original function h in a class-dependent manner, and this necessitates the existence of the seven branches for g. Let us denote the i-th branch of g by $g_i$. Then we can write h* as:

$$h^*(\ ) = \begin{cases} g_1(h(x_1,x_2,x_3,x_4,y_1,y_2,y_3,y_4)) & \text{if four-point tuple is in class 1} \\ g_2(h(x_1,x_2,x_3,x_4,y_1,y_2,y_3,y_4)) & \text{if four-point tuple is in class 2} \\ g_3(h(x_1,x_2,x_3,x_4,y_1,y_2,y_3,y_4)) & \text{if four-point tuple is in class 3} \\ g_4(h(x_1,x_2,x_3,x_4,y_1,y_2,y_3,y_4)) & \text{if four-point tuple is in class 4} \\ g_5(h(x_1,x_2,x_3,x_4,y_1,y_2,y_3,y_4)) & \text{if four-point tuple is in class 5} \\ g_6(h(x_1,x_2,x_3,x_4,y_1,y_2,y_3,y_4)) & \text{if four-point tuple is in class 6} \\ g_7(h(x_1,x_2,x_3,x_4,y_1,y_2,y_3,y_4)) & \text{if four-point tuple is in class 7} \end{cases} \quad 7$$

In the above expression each of the seven branches can be determined and/or approximated as discussed below.

The invention operates to separate the total probability density function into seven contributions by tagging each four-point tuple with a class identifying number (a number between 1 and 7 inclusive—see also FIG. 5) and a quadrilateral arrangement type (NCQ or CQ), and acting on each contribution in a particular way to create a uniform distribution, within tolerance, of the produced invariant values over [0,1]×[0,1] for each of the respective contributions. Then, the uniformly distributed contributions are combined by a stacker component 1650 (see FIG. 16B) to produce a cumulative contribution that is uniform over [0,1]×[0,1], within tolerance.

FIG. 14, comprising FIGS. 14A and 14B, shows schematically the stacking of the seven components that correspond to the seven branches of h*, i.e. the processes by which the respective regions are flattened, and contribute to the probability density function, after the above mentioned operations of stretching, flipping, rotating, and flattening have been carried out in an appropriate manner. Again, it should be stressed that each one of these operations carries out a remapping of the invariant values with the actual remapping operation being specific to the class i. A superposition of the seven contributing components after they have undergone the remapping is the probability density function f(u',v') for the remapped u' and v', i.e. the probability density function for the above-designed and described, invariant-producing function h*.

A few more things should be pointed out regarding the identity and nature of the contributing components from classes 1, 3, 5 and 7. As indicated, the final result may be the produced by joining either 4 contributions of type 1050, or 2 contributions of type 1050 and 1 contribution of type 1150, or 2 contributions of type 1150. The explanation for this has as follows: if we decide to apply a stretching operation 1060 to one of the four contributions from classes 1, 3, 5, and 7, an odd-number, namely 3, of contributions will remain. Clearly, only flipping (1160) or rotation (1170) cannot produce the desired effect because it takes two contributions of type 1100 to "build" one contribution of type 1150, and that would leave one remaining contribution 1100 that would remain unmatched. So if stretching operations are to be applied they will have to be applied always to an even number of contributions, i.e. either 0, 2, or 4. Also, if flipping or rotating is to be applied, it will have to be applied to either 1 or 2 of the contributions 1100, but not more, giving rise to either 1 or 2 contributions of type 1150; the reason for this is that one original contribution 1100 can be matched with precisely one flipped, or rotated contribution 1100 to produce one contribution of type 1150, and there is exactly four contributions 1100 available.

If the contributions of each of the seven classes are redistributed properly, then the joint effect of them will be the result of the superposition of the various components. This joint effect should be the parallelepiped shown in FIG. 14B. The existence of a parallelepiped indicates that the invariant-producing function h* shows no preference for some invariant values over others. Its volume should be equal to the integral of the probability density function f(u', v') over the entire domain in which it is defined, and thus equal to 1.

Now, recall that the only place where exact formulas could not be derived was in the case of the contributions corresponding to the classes 2, 4, and 6. Indeed, instead of evaluating the integral 6, an approximation of its value was derived with the help of nonlinear minimization techniques. Any observed deviation from the perfect lack of preference would be the direct result of the not-perfect approximation of the integral's value. It is clear that with the employment of more sophisticated approximation techniques an increasingly better fit can be achieved, thus resulting in a smaller deviation from the perfect lack of preference of some values over others.

Applying traditional Monte-Carlo simulation to the novel function h* that corresponds to a square feature domain, and using the mechanism described above, a discretized version of the remapped distribution function for h* can be produced, and is expected to look like the depiction of FIG. 14B.

FIG. 15A shows the mesh 1510 of the distribution of the invariant values, for a large number of four-point tuples that have been drawn randomly and uniformly from a square domain; the operations dictated by h* have been applied during the synthesis of the mesh. FIG. 15B shows the isocontours 1520 for the distribution of FIG. 15A. It can be observed that the degree of preference is uniform over the entire range of invariant values, within a tolerance 1530. This observed tolerance is due to the fact that no closed-form expression for the pyramid-like shape of FIG. 12C was derived but instead an approximation of it was computed.

FIG. 16, comprising FIGS. 16A and 16B, is a flowchart of a Monte-Carlo process 1600 and shows the steps performed to accumulate the necessary knowledge, and build the appropriate mechanism that is then used to produce the result shown in FIGS. 15A and 15B. In essence, this Figure recapitulates the various steps taken and described so far. The process begins with identifying the shape of the domain where the four-point tuples will be drawn randomly from, i.e. a square, an ellipse, a disc etc. A four-point tuple is drawn randomly and uniformly from the convex domain K in step 1610. The prior-art transformer proceeds to apply a first mapping 1620 of the four-point tuple to a point in the space of invariants via application of Eqns. 2, whereas the novel tagger identifies 1625 the four-point tuple as belonging to one of the seven classes (see FIG. 5) and one of the two types of quadrilateral arrangement (either CQ or NCQ).

So, in essence the transformer implements Eqns. 2, whereas the novel tagger uses the coordinates of the four-point tuple members (this is the input to the transformer) to determine which one of the seven classes the tuple belongs to, and also the quadrilateral arrangement of the tuple's members.

The outputs of both the transformer and the tagger are in turn the input for the step 1630 which keeps track of only those invariants produced by four-point tuples belonging to one, some or all classes and/or quadrilateral arrangements. The invariants are kept track of by means of tables (one, some, or all seven) that correspond to a tessellation of the finite-extent region [0,1]×[0,1] of the space of invariants. The i-th such table corresponds to a discretized contribution to the probability density function of u and v from four-point tuples belonging in the i-th four-class (see FIG. 5). At any given point in time during the Monte-Carlo simulation, the tables that are being kept track of are made available at step 1635. Steps 1630 and 1635 are optional in the sense that they are enabled or disabled based on which mode the redistribution equalizer 1640 operates in (see below for a description of the two modes of operation).

Once the tables are complete, they are made available at step 1635 and are in turn input into the equalizer process at step 1640. These tables can be seen in FIG. 9 (item 987) and as a block diagram in FIG. 24. The latter Figure graphically indicates the non-uniformity of the preference for certain values of the members u and v of the invariant 2-tuple.

The novel equalizer is a redistribution equalizer 1640 and can function in one of two modes: a knowledge accumulation mode and a redistribution mode.

The equalizer begins functioning in its knowledge accumulation mode 1640 and incorporates a process whose purpose is to use the knowledge obtained by the occupancy patterns of the various tables at its input (these patterns which are part of the mentioned discoveries are depicted in FIGS. 8A1/B1 through 8A7/B7) in order to derive necessary remappings (the $g_i(.)$'s) that when applied to the invariants generated by the prior art transformer (step 1620) will effectively redistribute the seven contributing components so that they have the desired properties. The equalizer will operate on the various tables once it has determined that statistical behavior has established itself, if not, more four-point tuples need to be drawn from the convex domain K and the process branches back to the step 1610. A number of criteria can be applied to determine whether statistical behavior has been achieved.

When statistical behavior has been established by known tests, the equalizer operates on the individual tables differently. First, each table is examined to determine the corresponding occupancy pattern. For the problem at hand, there are two possible patterns: type 1000/1100 (see FIGS. 10A and 11A), or type 1200 (see FIG. 12A). As has already been mentioned above, the shape of the domain K will impact on the quantitative descriptions of each pattern (e.g. height H) but their qualitative characteristics (e.g. the existence of a parallelepiped+pyramid-like shape such as 1200) will remain the same.

If a table's occupancy pattern resembles 1000/1100 (=component produced by four-point tuples in CQ arrangement and in one of the classes 1, 3, 5, or 7), the equalizing process has a choice between applying a "stretch" operation 1060, or a "flip" operation 1160, or a "rotate" operation 1170 or a combination of them—see also relevant discussion on previous page. The decision of which operation to apply to which component can be arbitrary or it can be based on preferences.

If a table's occupancy pattern resembles 1200 (=component produced by four-point tuples in NCQ arrangement and in one of the classes 2, 4, or 6), the equalizing process will determine and then apply an appropriate "flatten" operation. The determination of the appropriate expression will take place during the execution of the "approximate" process (see below). The "approximate" operation has already been mentioned above, and a more detailed description appears below.

All the choices that are built into the equalization process, regarding the type of operations applied to the various components, will in turn determine and define how to operate on a given component.

After the necessary decisions have been made in terms of which operations to apply to which components, the redistribution equalizer 1640 enters a new mode that of redistribution. While operating in the redistribution mode the equalizer proceeds and applies the remapping choices to the invariant values produced by four-point tuples. More four-point tuples are generated at step 1610, steps 1630 and 1635 are bypassed, and the equalizer signals the transformer 1620 and tagger 1625 to route their output directly into the redistribution equalizer stage 1640. For every invariant (i.e. output of the transformer) that is presented at its input during this mode, the equalizer 1640 uses the output of the tagger 1625 to determine which of the seven possible remapping operations to apply to the invariant 2-tuple, then applies it. If the four-point tuple belongs in class i then the result of the corresponding remapping is accumulated by the table i'. A lot of four-point tuples are produced having the appropriate distribution over the convex domain K until statistical behavior has established itself. At that point the equalizer makes available all seven tables i' for the stacker process to proceed (step 1645). These tables can be seen in FIG. 9 (item 987) and schematically in FIG. 25. The latter Figure graphically indicates the achieved uniformity, within tolerance, of the preference for certain values of the members u and v of the invariant 2-tuple.

In essence, the redistribution equalizer effects the remapping of the 2-tuple corresponding to each of the seven regions by redistributing all of the 2-tuples to produce a new distribution of 2-tuples that is uniform over the range of invariants. This redistributing is determined by the region arrangement and the quadrilateral arrangement of the respective four-point-tuple and causes a frequency of occurrence of each of the 2-tuples that is the same within a tolerance.

The stacker uses the seven redistributed tables i' produced by the equalizer operating in redistribution mode and combines them to produce the net effect (FIGS. 15A and 15B) of applying the remapping choices $g_i$ to the output of the transformer—step 1650. The output of the stacker is a discretized version of the probability density function for the mechanism that the equalizer implements.

The output of the stacker is evaluated at step 1655 to determine whether the quality of the produced results is within the acceptance bounds. This evaluation step is necessary because it may happen that the redistribution equalizer cannot evaluate the integral 6 and an approximation operation is necessary. This approximation may take place in an iterative manner where intermediate approximation results for some of the contributions (for example: components 1240 and 1260 of classes 2, 4, and 6) are examined by combining them with the remaining contributions (components 1050 and/or 1150) during the stacker step 1650—see also FIGS. 14A and 14B. Or, a battery of standard and known approximation methods may be attempted in turn until a satisfactory approximation is produced. If the result of the stacking 1650 is not within acceptable tolerance, then step 1660 branches back to the equalizer and notifies the latter accordingly. The equalizer reenters the knowledge accumulation mode and the process 1600 continues by branching back to step 1610. If the result of the stacking falls within a predetermined tolerance 1530, the process 1600 terminates.

FIG. 17 is a flowchart showing the steps performed by a "stretch" process 1700. Referring back to the FIG. 10A, the pattern of occupancy 1000 can be thought of as the joint probability density function of the random variables U and V. This probability density function is uniform over the triangular domain defined by the triangle whose vertices are the points (0,0), (1,0) and (0,1) of the space of invariants. What is sought is a remapping function g such that $$g: U,V \rightarrow U'V' \qquad 8$$

and the joint probability density function of U' and V' is uniform over the square |0,1 |×|0,1| of the space of invariants. In essence, this function remaps a given invariant 2-tuple (u,v) produced by prior-art transformer 1620 (1710) to a 2-tuple (u',v') through an operation whose effect is reminiscent of stretching (1720). One such remapping function is:

$$u'=(u+v)^2 \qquad 9$$
$$v'=v/(u+v)$$

Other remapping functions are also possible.

FIG. 18 is a flowchart showing the steps performed by a "flip" process 1800. As has already been discussed above, instead of the stretch process, a contribution 1100 could be rotated 1160 around the u+v=1 line. In essence, the corresponding function remaps the invariant 2-tuple (u,v) produced by prior-art transformer 1620 (1810) to a 2-tuple (u',v') by rotating it around the u+v=1 line (1820); the remapping function is:

$$u'=v \quad v'=u \qquad 10$$

FIG. 19 is a flowchart showing the steps performed by a "rotate" process 1900. Another alternative to the stretch process for contributions 1100 is a rotation 1170 around the axis that is perpendicular to the u-v plane and passes by the point (0.5,0.5) of the space of invariants; in essence, the corresponding function remaps the invariant 2-tuple (u,v) produced by prior-art transformer 1620 (1910) to a 2-tuple (u',v') by rotating it around this axis (1920). The remapping function is:

$$u'=-u+1$$
$$v'=-v+1 \qquad 11$$

It should be pointed out that the remapping operations carried out by the "stretch," "flip," and "rotate" processes are independent of the shape of the convex domain K!

FIG. 20 is a flowchart showing the steps performed by an "approximate" process 2000. This process is carried out by the equalizer and it includes the determination of the expression for the contribution to the probability density function from invariant values that are produced by classes 2,4, and 6.

The need for the approximate process was introduced earlier, during the discussion of FIG. 13. As was stated, one option for deriving the necessary flattening equations is the evaluation of the integral 6; unfortunately, this has not proven tractable to this day. As an alternative approach, the value of the integral could be approximated by making use of simulation data (Monte-Carlo simulation) that produce contributions such as the ones shown in FIGS. 8A2/8B2, 8A4/8B4, and 8A6/8B6. Thus, the "approximate" process comprises a necessary step that allows the "flatten" process to be carried out.

The approximation process 2000 begins by accessing 2010 the available numerical data that represent a discrete version of the function to be approximated; these data are typically the product of a Monte-Carlo simulation process. The approximate process proceeds with the guessing 2020 of the functional form of f(u,v) that is expected to best approximate the data. There is no available "recipe" that prescribes a specific way to proceed with this guessing. The objective of this step is to determine a suitable functional expression that can be used to describe the available data. The method by which one can arrive at such a determination is data dependent and most of the time it is based on the empirical evaluation of the data. For all practical purposes, this step is an art form in itself. Occasionally, a number of different functional forms with varying degrees of quality of fit may have to be tried before a best such form can be selected.

Once a best functional form is chosen, it is typically in a parametric form (2030), i.e. the coefficients of the various components of the expression are in terms of constants (parameters) whose values are not known and have to be computed. Again, most of the time the situation is such that the expression for f(u,v) incorporates the unknown parameters in a nonlinear manner. For example, the expression $f(u,v)=(a\ (u-b)^2+c\ (v-d)^2)^3$ is nonlinear in all of the parameters a, b, c, d, and e. In situations like this, the values of the parameters can typically be computed via a nonlinear minimization approach (2040).

Nonlinear minimization techniques suffer from their own set of shortcomings. Examples of these shortcomings include:

a. getting trapped in local minima; the minimization procedure will end up missing better solutions that may exist.
b. lack of convergence; the procedure may find itself in a multidimensional valley and end-up oscillating between the ridges of the valley.
c. sensitivity to the starting values; the parameters of the expression have to be given initial values for the minimization procedure to begin. Different starting sets of values are likely to lead to different solutions with varying degrees of quality, and some times they may not lead to convergence.

A non-limiting example of a functional form for approximating the pyramid-like shape shown in FIGS. 8A2/8B2, 8A4/8B4, 8A6/8B6 and 13A, is $$a_1a_3-a_1a_2(|u-v|+|u+v-1|)+a_4a_5((u-0.5)^4+(v-0.5)^4)+a_5a_6 \qquad 12$$

where $a_1$, $a_2$, $a_3$, $a_4$, $a_5$, and $a_6$ are unknown parameters. Interestingly, this particular expression is linear in each of the expression's parameters, but it should be stressed that this is typically not the case. Through use of the Levenberg-Marquardt or other appropriate method, the values $a_1$, $a_2$, $a_3$, $a_4$, $a_5$, and $a_6$ can be (and have been) determined for the specific domain K. To the above expression, we add the parallelepiped 1240 of FIG. 12B, in the form of an additive parameter $a_7$ whose value is also dependent on the shape of K. The resulting expression is $$f(u,v)=a_1a_3-a_1a_2(|u-v|+|u+v-1|)+a_4a_5((u-0.5)^4+(v-0.5)^4)+a_5a_6+a_7 \qquad 13$$

and approximates, within tolerance, the value of the integral 6. Note that the inventor has discovered that this particular expression may be used to approximate the data for the contributions from four-point tuples in classes 2, 4, and 6, when the four-point tuples are drawn uniformly from any convex planar domain K including triangle, square, (convex) polygons of order higher than 4, circles and ellipses; what is different in each case is the values assumed by $a_1$, $a_2$, $a_3$, $a_4$, $a_5$, $a_6$, and $a_7$. The values of these unknowns can be determined, and depend on the shape of the domain K.

Given this last expression, it should now be evident why the shape 1200 depicted schematically in FIG. 12A is a pyramid-like one. Indeed, the component involving the two absolute values provides a basic pyramid shape to which a circularly symmetric "bell" shape is superimposed; the "bell" shaped contribution is provided by the fourth-power expressions involving the u and v. Finally, the constant terms correspond to the parallelepiped 1240 of FIG. 12B.

With the values of the various parameters available, the next task is to identify which function will redistribute these values in such a manner that the newly-positioned invariants exhibit no preference for some values of the space of invariant over others. Using standard probability theory methods, it is easy to see that one possible function is:

$$u'=a_1a_3u+a_4a_5((u-0.5)^5+(0.5)^5+2u(0.5)^5)/5+(a_5a_6+a_7)(u-1)-a_1a_2((u-1)^3+u^3+1)/3$$

$$v'=a_1a_3v+a_4a_5((v-0.5)^5+(0.5)^5+2v(0.5)^5)/5+(a_5a_6+a_7)(v-1)-a_1a_2((v-1)^3+v^3+1)/3 \qquad 14$$

where u and v are the members of the invariant 2-tuple computed using the equations 2.

FIG. 21 is a flowchart showing the steps performed by a "flatten" process 2100. Having generated the invariant (u,v) using a prior-art transformer (2110), and having also carried out the "approximate" process, the "flattening" consists of applying the remapping expressions 14. Alternatively, notice, that if the value of the integral 6 is available in a closed-form expression, the actual remapping expressions (2120) to be used during this step will be different, but easily determinable by standard techniques.

At this point, the determination of the necessary invariant-producing expressions has been concluded for four-point tuples in any of the seven possible classes (see Eqn. 7). But having done so, it is now possible to produce and associate an invariant 2-tuple with each four-point tuple that would be given; furthermore, the method of producing such an association would guarantee that statistically the invariant 2-tuples produced for four-point tuples drawn randomly and uniformly from a given, fixed convex domain K would be distributed uniformly over the square [0,1]×[0,1], within tolerance.

In FIG. 22, the method of producing such an association is depicted. Non-limiting examples of use would include databases of fingerprints, airplanes, two-dimensional contours (polygonal or other) etc. Process 2200 begins with the selection of one object from the pool of the objects to be stored in the database at step 2205; the features of the selected object are also determined during this step. The features of the various objects are assumed to be distributed uniformly over a convex domain K. Once the shape of the domain is decided/determined, the appropriate instance of the "stretch," "flip," "rotate," and "flatten" processes is used in the steps that follow.

It should be pointed out that we have used the word "object" to abstractly refer to one of the recognizable items. As already mentioned, these items can be actual physical entities, for example fingerprints, and the definition of an object feature is directly related to the type of the object. For example if the recognizable items are airplane contours, then a typical (but non-limiting) choice for features would be the set of curvature extrema and discontinuities along the item's contour.

During step 2210, one or more four-point tuples are formed using features that are taken from the set of identified features for the object under consideration. Notice that depending on the situation, one, some, or all possible four-point tuples may be formed during the selection stage. A given feature may appear in more than one four-point tuples, or it may not. Also, it may be necessary to impose order in the features of a four-point tuple: for example, it may be that tuples $(f_i, f_j, f_k, f_l)$ and $(f_i, f_j, f_k, f_l)$—where $f_i$, $f_j$, $f_k$, and $f_l$ denote features of the object under consideration—should be considered distinct.

A four-point tuple is subsequently selected during the step 2215 and is then used as an input for both the transformer and the tagger processes. The transformer process applies the Eqns. 2 to produce an invariant 2-tuple (unmapped tuple) in step 2220. The tagger identifies the selected four-point tuple as belonging to one of the seven classes i and one of the two possible arrangements (CQ or NCQ). The unmapped 2-tuple and the output of the tagger are then used by the repositioning equalizer during step 2230, the equalizer producing a remapped version (u',v') of (u,v). The equalizer makes use of the appropriate instances of the "stretch," "flip," "rotate," and "flatten" processes for the shape of the domain K under consideration. The implicit assumption here is that the Monte-Carlo process 1600 has already been employed for the given domain's shape and all necessary remapping branches of Eqn. 7 have been determined.

The new invariant 2-tuple is subsequently associated during step 2235 with the four-point tuple that was selected in 2215; possibly other information pertaining to one or more members of the four-point tuple, or the object may be associated with the new invariant 2-tuple. Optionally, a table 2300 may be accessed (2240) using the associations produced during step 2235. The associations may also be made available to other processes 2242.

During step 2245, the process checks whether there is more four-point tuples that have not been considered; if this is the case, the process branches back to step 2215. Otherwise, during step 2250 the process checks whether there is more objects that have not been considered; if this is the case the process branches back to step 2205, otherwise the process terminates at step 2255.

FIG. 23 is a block diagram of a table indexed by the invariants generated by the present invention (see FIG. 22) and used by the process 2200. The table is a data structure 2300 that associates an index 2314 corresponding to a 2-tuple (typically (u',v')) with information about the identities 2322 of the object's features comprising the four-point tuple, the identity 2321 of the object where the four-point tuple belongs and possibly other information 2323; for example, one may wish to add the identifier which distinguishes which of the 7 possible arrangements the four-point tuple is in, and whether it is in a CQ or an NCQ arrangement. All this information comprises an entry 2312 in the bucket that is being identified by the index 2314. Note that the four-point tuple associated with index 2314 may appear more than once in a given object, or in more than one objects in a database containing a plurality of objects. As a result, there is, in general, more than one entry 2312 of vector information in a record 2325 of the data structure 2300. Consequently, each such entry, typically 2312, includes identification information for each of the objects 2321A, ....2321N, ... in which the tuple creating the index 2314 appears. The index 2314 is formed that represents the four-point tuple under consideration. This index 2314 can be built by appropriately quantizing the members u' and v' of the invariant 2-tuple. In addition, this index can be mapped to an offset in a one-dimensional linear array like 2300 by using standard offset computation methods (e.g. 'stride' computation).

Given the availability of the process 2200, it is now possible to build a hashing-based store and retrieve scheme as per the description found in the introduction. The steps of the process 2200 can be used during two distinct phases.

First, process 2200 can be employed to populate a table (structured as a lookup or hash table) at step 2240 during a preprocessing phase: each of the various objects to be recognized are processed in turn and, by means of the process 2200, stored in the table. The dimensionality of the table is equal to 2, and the invariant 2-tuples (u', v') produced at step 2230 are used to identify a bucket of the lookup table where an entry pertaining to the object and the four-point tuple under consideration will be made; this entry typically contains enough information to uniquely identify the object, and the four-point tuple that generated it.

Second, and subsequently to the storage phase, the generated table can be used to provide fast access to information about the objects that are stored in the database. Again, the steps of the process 2200 are employed but in a different manner this time: when presented with an object whose identity is sought, invariant 2-tuples are produced at step 2230 for the query object and the respective bucket(s) of the table produced during the storage phase are accessed; all entries found in each such bucket are then collected and examined for multiple occurrences of some object's identifier—the query object is then claimed to be that database object with the most number of such entries in the retrieved collection of entries.

It should be pointed out that by design the association produced by the steps of process 2200 result in a table 2300 whose buckets each contain the same number of entries 2312, within tolerance. As such, the suggested method leads to: (a) improved discrimination power through better use of the hash table data structure (table of associations); (b) improved I/O behavior since no bucket will contain excessively large numbers of entries, and all buckets will contain the same, on the average, number of entries; (c) improved load sharing characteristics in multiple-processor environments: a given query object will now incur the same computational load on each of the processors, as a result of the way the table has been designed.

An additional comment can be made here regarding yet another, very important use of the table 2300. Throughout our discussion, the assumption was that the four-point tuples of the database objects were uniformly distributed over a convex domain K. Should this assumption be violated, the implication would be that some configurations of object features would be over-represented (recurrent configurations). Consequently, some four-point tuple configurations would be over-represented and so would the invariant 2-tuples generated by such configurations. The lookup table buckets corresponding to these invariant 2-tuples would thus contain a number of entries that would be observably larger than the number of entries in the remaining buckets of the table. Given that the expected occupancy of each bucket is constant, within tolerance, any observable deviation would directly reflect the existence of over-represented groups of features in the database of objects, thus permitting a qualitative assessment of the nature of the objects without necessitating a direct examination of each object in turn: all the objects of the database that share these over-represented groups can be identified directly by scanning the entries 2312 of the fuller buckets and operating on the entry fields 2321/2322/2323.

Moreover, one could proceed even further and label one or more sets of hash table buckets as corresponding to certain types of structures, e.g. corners of a specific type. This can be done as follows: beginning with the structure of interest (for example, this could be a "T-joint" corner), features are identified on the structure and the hash function is used to generate entries in the hash table for subsets of these features. The hash buckets that were the recipients of an entry are marked and their union reflects the set of hash buckets (equivalently: hash indices) corresponding to the structure of interest. Then, the hash table can be used to implement a predicate that answers the question whether a given database contains the structure of interest: the database is processed and for each considered object, the set of hash buckets in which an entry would otherwise be made is formed. Then this set is checked to determine whether it contains the set of marked hash buckets which correspond to the structure of interest. It is conceivable that occasionally a verification may be required—this is, in the general case, related to the nature of the hashing function that is used. What has just been described, clearly obviates the need for a manual inspection of the database, something that would be particularly difficult if the database models do not have a direct bearing on actual physical apparatus such as a car, an airplane, a molecule or a surface.

A note: the described affine-invariant generation mechanism results in buckets containing entries that will in general correspond to different four-point tuple configurations; for example, a four-point tuple belonging to class 1 (NCQ arrangement) may produce an entry in the same bucket as a four-point tuple belonging to class 4 (CQ arrangement). It may be beneficial to enhance each entry 2312 with this additional information prior to carrying out any operation employing the table.

Having the above mentioned predicate available, one can proceed to answer whether two sets of objects, each comprising one or more objects, share any sets of features (e.g. configurations of points along their contours). One way of doing so is by marking those of the hash table bins that would contain entries corresponding to the first of the two sets and then determining the extent of the intersection of this set of bins and of the set corresponding to the bins accessed by indices that the objects of the second set generate.

Finally, it should be pointed out that although the whole discussion has been focused on affine transformation on the plane that the database objects may undergo, the system and method are directly extendible to the cases of rigid and similarity transformations on the place. Indeed, the 2D affine transformation being the most general transformation on the plane, it subsumes the cases of the rigid and similarity transformations. If one wishes to enforce a specific type of transformation, it suffices to enhance the entries 2312 with the appropriate amount of information. For example, if rigid is the transformation of interest, entries 2312 will need to be augmented for example with the lengths of the vectors $p_2-p_1$ and $p_3-p_1$, or another equivalent constraint. Analogous steps need to be taken in the case where one wishes to enforce and focus only on similarity transformations on the plane.

Also, it should be added that when the equalizer operates in the knowledge accumulation mode the necessary data need not be produced through a Monte-Carlo simulation, but instead real data can be employed. The assumption of course is that this set of data conforms to the assumption of uniform distribution of the feature points in the appropriate convex domain.

FIG. 24 is a depiction of a table, indexed by the invariants generated by the present invention and used by the method in FIG. 22, that shows the occupancy distribution across the table's bins before the application of the method described in this invention. As has already been stated, the invariants generated using the set of Eqns. 2 produce a non-uniform occupancy across the various hash table buckets. This was also shown in detail in FIG. 7. FIG. 24 can be thought of as a 'left-to-right-top-to-bottom' listing of the various hash table bins shown in FIG. 7.

FIG. 25 is a depiction of a table, indexed by the invariants generated by the present invention and used by the method in FIG. 22, that shows the occupancy distribution across the table's bins after the application of the method described in this invention. As already implied by the occupancy densities shown in FIGS. 15A and 15B, the proposed invention produces a uniform (within tolerance) occupancy across the various hash table buckets. FIG. 25 can be thought of as a 'left-to-right-top-to-bottom' listing of the various hash table bins shown in FIG. 15.

Although depicted only graphically in FIGS. 24 and 25, the improvement that these two Figures imply has been observed during experiments with both synthetic (Monte-Carlo generated) and real data. Indeed, the application of the method has typically been shown to be very rewarding since it leads to observable improvements in storage utilization, computational power utilization, load balancing, improved discrimination etc.

Up to this point, the data used in our discussion has been synthetically generated. However, the method described, is directly applicable to real-world data. As a case in point, FIG. 26 is a mesh of the invariants produced by the system for a real-world database containing six hundred fingerprints from various individuals. What is interesting is that the values of the various parameters were derived using synthetically generated data and the derived system and method were subsequently used with real-world data (i.e. the fingerprints of the six hundred individuals). As can be seen from this Figure all assumptions that have been made in the development of the method and system are correct in the sense that the obtained results (i.e. distribution of the generated indices/invariants) are as expected (i.e. uniformly distributed within tolerance).

Finally, we demonstrate the use of the table 2300 in determining the existence of recurrent structures in the employed database of objects. In order to show that, the database containing the fingerprints of the six hundred individuals was augmented by the addition of multiple occurrences of the same fragment from the contour (as seen from the side) of an F16 aircraft. FIG. 27 is a mesh of the invariants produced by the system after the database used to produce FIG. 26 was augmented to also contain the multiple copies of the F16's fragment. There were four point features that could be identified on the fragment; these four features produced multiple, ordered four-tuples and the associated invariants. The invariants generated by the recurrently occurring fragment correspond to the spikes seen in this Figure.

The discussion is concluded with the mention that an extension of this method and system to three dimensions is given in U.S. patent application No. 08/786,054 entitled "THREE-DIMENSIONAL AFFINE-INVARIANT HASHING DEFINED OVER ANY THREE-DIMENSIONAL CONVEX DOMAIN AND PRODUCING UNIFORMLY-DISTRIBUTED HASH KEYS" to Rigoutsos which is filed on the same day as this application and is herein incorporated by reference in its entirety.

Given this disclosure, alternative equivalent embodiments of this inventions would become apparent to one skilled in the art. These embodiments are also within the contemplation of the inventor.

I claim:

1. A computer system of one or more processors for producing a uniform distribution of affine invariants for a plurality of one or more objects, comprising:

a database of one or more objects, each of the objects identified by a set of two-dimensional object points, the set of two-dimensional object points uniformly selected from an object feature domain, each of the objects further capable of being transformed through zero or more affine transformations, the database being stored in one or more memories that are accessible by the processors;

one or more four-point tuples of four object points, three of the points in the four-point tuple being non collinear and dividing the object feature domain into seven regions, the fourth point of the four-point tuple being in one of the seven regions, and defining one of two types of quadrilateral arrangement of the four-point tuple that include a non-convex quadrilateral (NCQ) arrangement and a convex quadrilateral (CQ) arrangement, four of the seven possible regions corresponding to the NCQ arrangements and the remaining three of the regions corresponding to the CQ arrangements;

a transformer for representing each of the four-point tuples by a 2-tuple that is invariant under any of the affine transformations, the transformer producing a range of invariants for all arrangements of the four-point-tuples;

a tagger that identifies each of the four-point tuples as having one of the seven region arrangements and one of the two types of the quadrilateral arrangements; and an equalizer, executing on one or more of the processors, that creates a remapping for the 2-tuples corresponding to each of the seven region arrangements by redistributing all of the 2-tuples to produce a new distribution that is uniform over the range of invariants, the redistributing determined by the region arrangement and the quadrilateral arrangement of the four-point tuple as identified by the tagger.

2. A system, as in claim 1, further comprising a stacker that stacks the new distributions to produce a uniform distribution for all the affine invariants produced by the transformer.

3. A system, as in claim 1, further comprising a table having a plurality of records, each record having an index defined by the invariant 2-tuple, one or more information fields, each information field identifying one of the objects from which the invariant 2-tuple was generated and all of the objects from which the invariant 2-tuple was generated being in one or more of the information fields, where the number of information fields is the same for all of the records within a tolerance.

4. A system, as in claim 3, further comprising a loader, that loads each of the processors with part of the records so that the burden induced on each of the processors by a task that operates on the table is balanced.

5. A system, as in claim 1, where the object points are uniformly selected from the object feature domain, the domain being any one of the following: a convex polygon (e.g. triangle, square, rectangle etc.), a circle, and a ellipse.

6. A system, as in claim 1, where the quadrilateral arrangement is NCQ and the equalizer redistributes the 2-tuples by moving each 2-tuples from an original location to a new location that is dependent on the original location of the 2-tuple.

7. A system, as in claim 6, where the new location (u',v') is given by $$u'=(u+v)^2$$
$$v'=v/(u+v)$$

where u is the original u-coordinate and v is the original v-coordinate.

8. A system, as in claim 6, where the new location of some of the 2-tuples is line symmetrical to the original location of the respective 2-tuple.

9. A system, as in claim 6, where the new location of some of the 2-tuples is derived from the original location of the respective 2-tuple via rotation and translation.

10. A system, as in claim 1, where the quadrilateral arrangement is CQ and the equalizer redistributes the 2-tuples by moving each 2-tuple from an original location to a new location that is dependent on the original location of the 2-tuple.

11. A system, as in claim 10, where the object feature domain is a square and the redistribution can be approximated by:

$$u'=a_1a_3u+a_4a_5((u-0.5)^5+(0.5)^5+2u(0.5)^5)/5+(a_5a_6+a_7)(u-1)-a_1a_2((u-1)^3+u^3+1)/3$$

$$v'=a_1a_3v+a_4a_5((v-0.5)^5+(0.5)^5+2v(0.5)^5)/5+(a_5a_6+a_7)(v-1)-a_1a_2((v-1)^3+v^3+1)/3.$$

12. A system, as in claim 1, where the object is a two-dimensional representation.

13. A system, as in claim 12, where the two-dimensional representation is any one of the following: a graphical image, a human fingerprint, a design, a contour, and any collection of two-dimensional points.

14. A method for producing a set of 2-tuple affine invariants with a range, the affine invariants being distributed over the range, comprising the steps of:

a. providing a set of two-dimensional object points that describe an object feature domain of an object in an object set of one or more objects, the object points being uniformly distributed over a convex domain, each of the objects being capable of being transformed through one or more affine transformations;

b. selecting one or more four-point sets from the set of two-dimensional object points to generate one or more four-point-tuples, each of the four-point tuples dividing the object feature domain into a region arrangement with seven regions, the seven regions defined by the four-point tuple as one of four non convex quadrilateral arrangements and one of three convex quadrilateral arrangements;

c. transforming each of the four-point tuples by affine transformation to produce a 2-tuple affine invariant representing each of the four-point-tuples;

d. tagging each of the four-point tuples as having one of the seven regions and one of any of the non convex quadrilateral arrangements and convex quadrilateral arrangements; and e. remapping the 2-tuple affine invariants corresponding to each of the seven regions by redistributing all of the 2-tuple affine invariants to produce a new distribution of 2-tuple affine invariants that is uniform within tolerance over the range, the redistributing determined by the region arrangement and the quadrilateral arrangement of the respective four-point-tuple to cause a frequency of occurrence of each of the new 2-tuple affine invariants to be the same within a tolerance.

15. A method, as in claim 14, further comprising the step of:

f. stacking all the new distributions to produce a uniform within the tolerance distribution for all the new affine invariants.

16. A method for storing two-dimensional objects in a database, comprising the steps of:

a. selecting an object from the set of objects;

b. identifying a set of feature points in the selected object;

c. producing one or more sets of four-point tuples from the set of identified features, each of the four-point tuples dividing the object feature domain into a region arrangement with seven regions, the seven regions defined by the four-point tuple as one of four non convex quadrilateral arrangements and one of three convex quadrilateral arrangements;

d. transforming each of the four-point tuples by affine transformation to produce a 2-tuple affine invariant representing each of the four-point-tuples;

e. tagging each of the four-point tuples as having one of the seven regions and one of any of the non convex quadrilateral arrangements and convex quadrilateral arrangements; and f. generating a new 2-tuple affine invariant corresponding to each of the seven regions by repositioning the 2-tuple affine invariant to produce a new distribution of 2-tuple affine invariants that is uniform within a tolerance over the range;

g. associating and storing the new 2-tuple affine invariant with the respective four-point tuple from which the new 2-tuple affine invariant was generated.

17. A method, as in claim 16, further comprising the steps of:

h. establishing a predicate about the database based on the labeling of one or more selected new 2-tuple affine invariants.

18. A method, as in claim 16, further comprising the steps of:

h. qualitatively assessing information about one or more of the objects in the database by examining the size of the tolerance and one or more locations where deviations occur.

19. A method, as in claim 16, where the two-dimensional objects include any one of the following: a graphical image, a human fingerprint, a design, a contour, and any collection of two-dimensional points.

20. A method for accessing one or more two-dimensional objects from a database, using a query set of one or more objects, the method comprising the steps of:

a. selecting an object from the query set of objects;

b. identifying a set of feature points in the selected object;

c. producing one or more sets of four-point tuples from the set of identified features, each of the four-point tuples dividing the object feature domain into a region arrangement with seven regions, the seven regions defined by the four-point tuple as one of four non convex quadrilateral arrangements and one of three convex quadrilateral arrangements;

d. transforming each of the four-point tuples by affine transformation to produce a 2-tuple affine invariant representing each of the four-point-tuples;

e. tagging each of the four-point tuples as having one of the seven regions and one of any of the non convex quadrilateral arrangements and convex quadrilateral arrangements; and f. generating a new 2-tuple affine invariant corresponding to each of the seven regions by repositioning the 2-tuple affine invariant to produce a new distribution of 2-tuple affine invariants that is uniform within tolerance over the range;

g. using the new 2-tuple affine invariant to access a memory containing a plurality of associations between one or more stored 2-tuple affine invariants and respective information about one or more stored objects.

21. A method, as in claim 20, where the two-dimensional objects include any one of the following: a graphical image, a human fingerprint, a design, a contour, and any collection of two-dimensional points.

22. A computer system of one or more processors for producing a distribution of affine invariants for a plurality of one or more objects, comprising:

a database means for storing one or more objects, each of the objects identified by a set of two-dimensional object points, the set of two-dimensional object points uniformly selected from an object feature domain, each of the objects further capable of being transformed through zero or more affine transformations, the database being stored in one or more memories that are accessible by the processors;

one or more four-point tuple means of four object points for representing one or more object features, three of the points in the four-point tuple being non collinear and dividing the object feature domain into seven regions, the fourth point of the four-point tuple being in one of the seven regions, and defining one of two types of quadrilateral arrangement of the four-point tuple that include a non convex quadrilateral (NCQ) arrangement and a convex quadrilateral (CQ) arrangement, four of the seven possible regions corresponding to the NCQ arrangements and the remaining three of the regions corresponding to the CQ arrangements;

a transformer means for representing each of the four-point tuples by a 2-tuple that is invariant under any of the affine transformations, the transformer producing a range of invariants for all arrangements of the four-point-tuples;

a tagger means for identifying each of the four-point tuples as having one of the seven region arrangements and one of the two types of the quadrilateral arrangements; and an equalizer means, executing on one or more of the processors, for creating a remapping for the 2-tuples corresponding to each of the seven region arrangements by redistributing all of the 2-tuples to produce a new distribution that is uniform over the range of invariants, the redistributing determined by the region arrangement and the quadrilateral arrangement of the four-point tuple as identified by the tagger.

* * * * *